(12) United States Patent
Matsushige et al.

(10) Patent No.: US 7,353,435 B2
(45) Date of Patent: Apr. 1, 2008

(54) STORAGE DEVICE SYSTEM AND SIGNAL TRANSMISSION METHOD FOR STORAGE DEVICE SYSTEM

(75) Inventors: Hiromi Matsushige, Hiratsuka (JP); Hiroshi Suzuki, Sagamihara (JP); Masato Ogawa, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 655 days.

(21) Appl. No.: 10/943,916

(22) Filed: Sep. 20, 2004

(65) Prior Publication Data
US 2006/0026336 A1 Feb. 2, 2006

(30) Foreign Application Priority Data
Jul. 29, 2004 (JP) ............................... 2004-222031

(51) Int. Cl.
G06K 5/04 (2006.01)
G06F 11/00 (2006.01)
G06F 13/00 (2006.01)
G01V 1/00 (2006.01)

(52) U.S. Cl. ..................... 714/699; 714/85; 714/106; 367/38; 710/36

(58) Field of Classification Search .................. None
See application file for complete search history.

(56) References Cited
U.S. PATENT DOCUMENTS

| | | | |
|---|---|---|---|
| 5,412,691 A | 5/1995 | Ginzburg et al. | |
| 6,266,379 B1 | 7/2001 | Dally | |
| 6,615,314 B1 | 9/2003 | Higaki et al. | |
| 6,763,409 B1 | 7/2004 | Elliott | |
| 2002/0062387 A1 | 5/2002 | Yatziv | |
| 2002/0176493 A1 | 11/2002 | Oi | |
| 2003/0135782 A1 | 7/2003 | Matsunami et al. | |
| 2003/0189811 A1 | 10/2003 | Peeke et al. | |
| 2004/0037202 A1* | 2/2004 | Brommer et al. ............. 369/94 |
| 2004/0047409 A1 | 3/2004 | Lee et al. | |

(Continued)

FOREIGN PATENT DOCUMENTS
EP 1 094 386 A1 5/1998

(Continued)

OTHER PUBLICATIONS
Extended European Search Report dated Aug. 22, 2007.

*Primary Examiner*—Alan S. Chen
(74) *Attorney, Agent, or Firm*—Reed Smith LLP; Stanley P. Fisher, Esq.; Juan Carlos A. Marquez, Esq.

(57) ABSTRACT

The storage device system comprises: a plurality of signal transmission paths connected respectively to a plurality of installed storage devices; a plurality of system side communications sections for transmitting and receiving signals respectively to and from the plurality of storage devices, via the plurality of signal transmission paths; and one or a plurality of signal correcting sections for inputting a signal exchanged between the plurality of storage devices and the plurality of system side communications sections, correcting the input signal on the basis of a previously established correction parameter, and outputting the corrected signal. The correction parameter is a value set on the basis of at least one of the length of the signal transmission path between the storage device and the system side communications section, the wavelength attribute of the signal input to the signal correcting section, and the storage device attribute relating to the storage device.

10 Claims, 29 Drawing Sheets

U.S. PATENT DOCUMENTS

2004/0243666 A1 12/2004 Wood
2005/0111567 A1 5/2005 Hsu et al.
2005/0157781 A1 7/2005 Ho et al.
2006/0067619 A1* 3/2006 Welch et al. .................. 385/37

FOREIGN PATENT DOCUMENTS

JP 2000-347816 6/1999

* cited by examiner

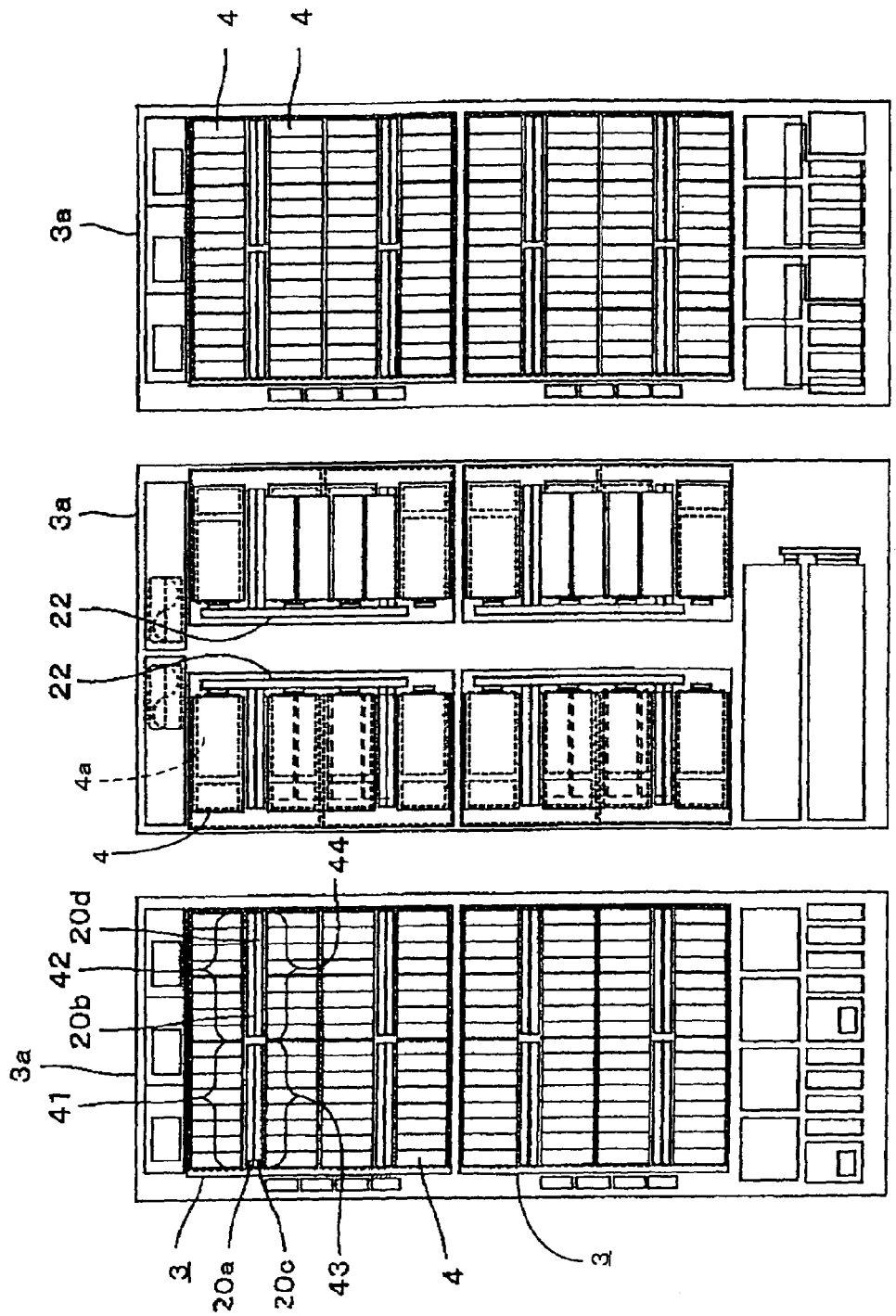

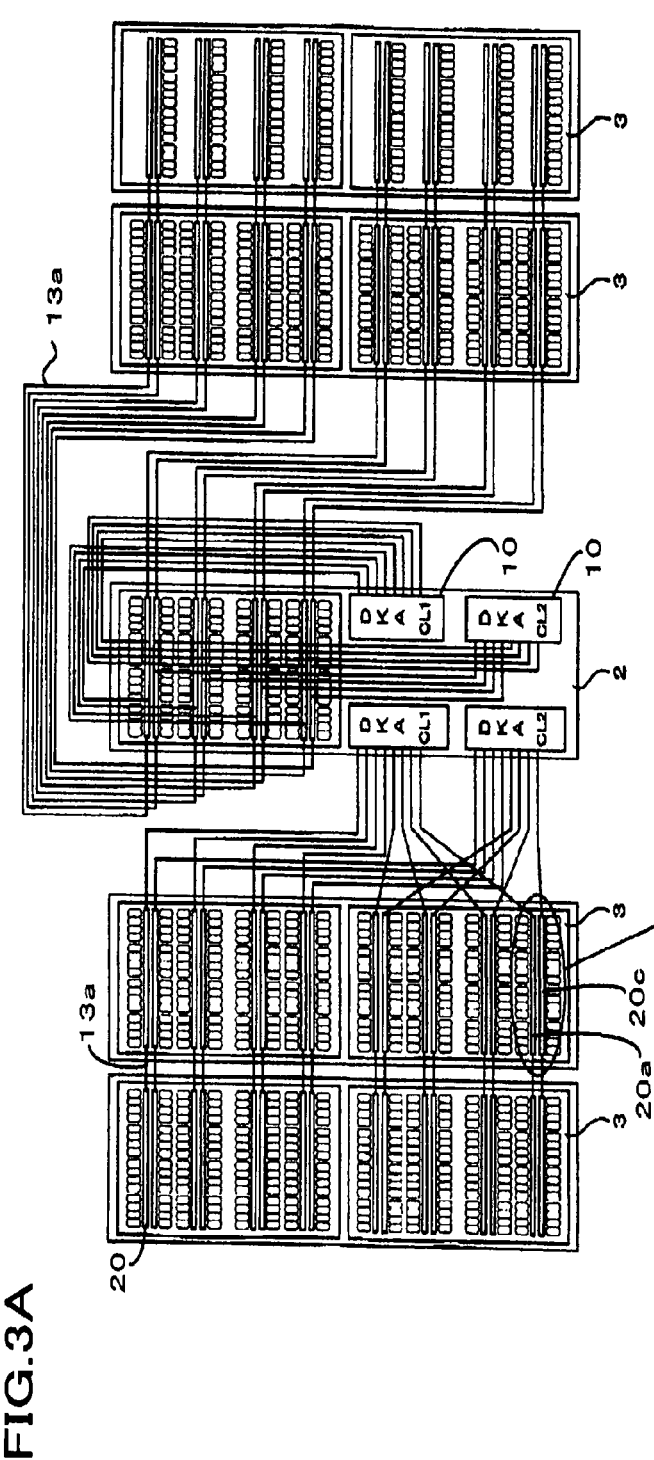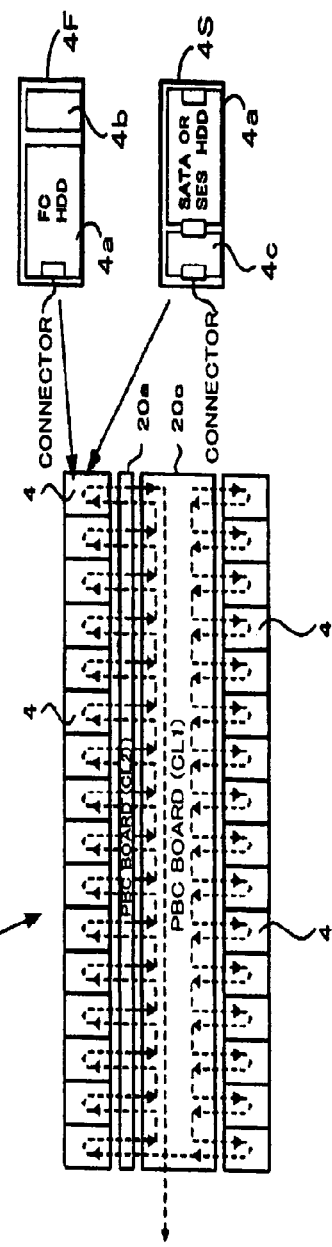
FIG.3A
FIG.3B

LENGTH OF THE WIRE BETWEEN THE PBC AND THE HDD   L (cm)

| DISK DRIVE INSTALLATION POSITION (Prev#) | LENGTH OF THE WIRE BETWEEN THE PBC AND THE HDD (CM) | ISI ATTENUATION (dB) | PRE-EMPHASIS SETTING (dB) |
|---|---|---|---|
| 18 | 10 | -1.5 | +1.5 |
| 1A | 30 | -3.5 | +3.5 |
| 1C | 50 | -5.6 | +5.6 |
| 1F | 70 | -9.0 | +9.0 |

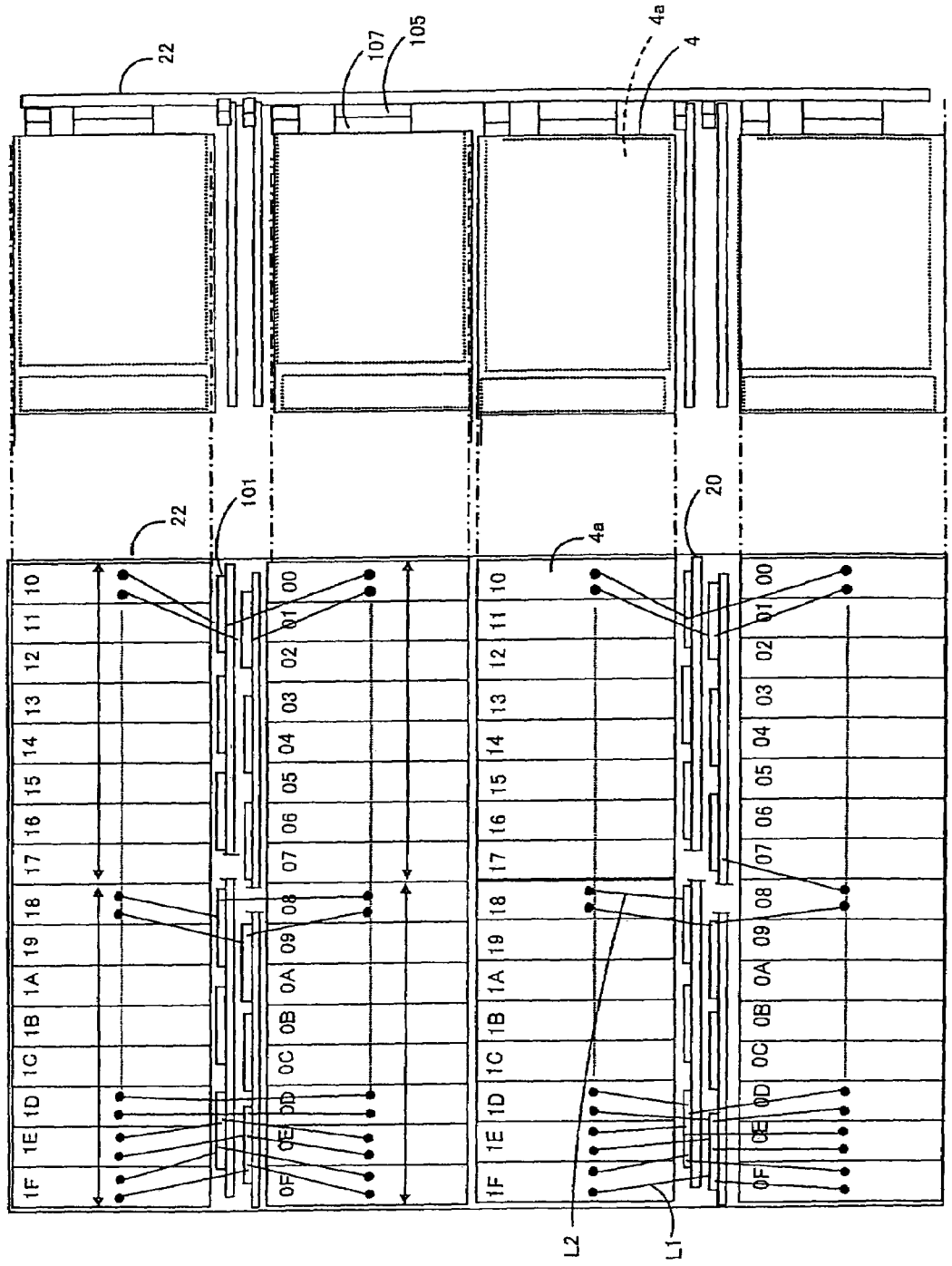

| DISK DRIVE INSTALLATION POSITION (Prev#) | LENGTH OF THE WIRE BETWEEN THE PBC AND THE HDD (CM) | ISI ATTENUATION (dB) | PRE-EMPHASIS SETTING (dB) |
|---|---|---|---|
| 18 | 15 | −1.8 | +1.8 |
| 1A | 25 | −2.5 | +2.5 |
| 1C | 26 | −2.6 | +2.6 |
| 1F | 30 | −3.8 | +3.8 |

INPUT WAVEFORM

EQUALIZER (PRE-EMPHASIS CIRCUIT)

OUTPUT WAVEFORM (AFTER HIGH-RANGE CORRECTION)

(OUTPUT FROM 851)

(OUTPUT FROM 852)

FIG.25A
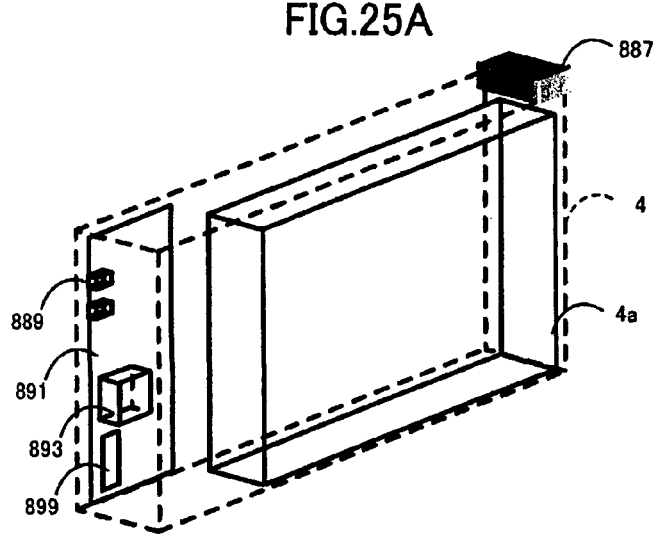
FIG.25B
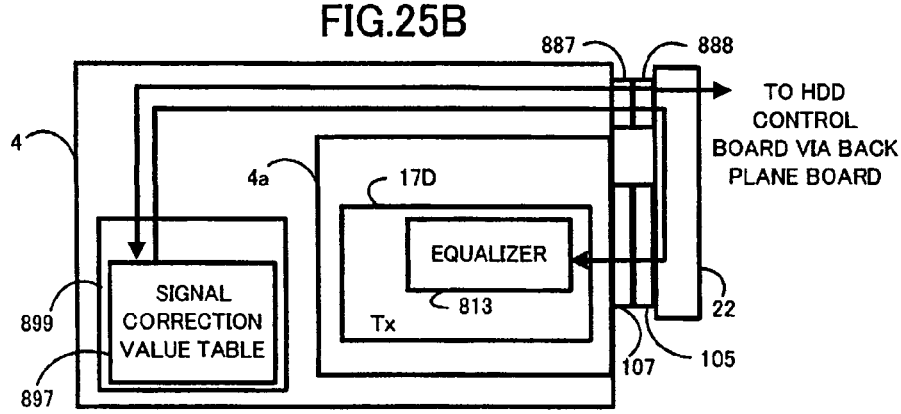
TO HDD CONTROL BOARD VIA BACK PLANE BOARD
FIG.25C
| bit | DISK ATTRIBUTE | BOOST VALUE(dB) |
|---|---|---|
| 0 | COMMON 2 Gb/s FC HDD | .... |
| 1 | CO. A 4 Gb/s FC HDD | .... |
| 2 | CO. B 4 Gb/s FC HDD | .... |
| 3 | CO. A 3 Gb/s SAS HDD | .... |
| 4 | CO. B 3 Gb/s SAS HDD | .... |
| 5 | COMMON 1.5 Gb/s SATA HDD | .... |
| 6 | CO. A 3 Gb/s SATA HDD | .... |
| 7 | CO. B 3 Gb/s SATA HDD | .... |

FIG.26A

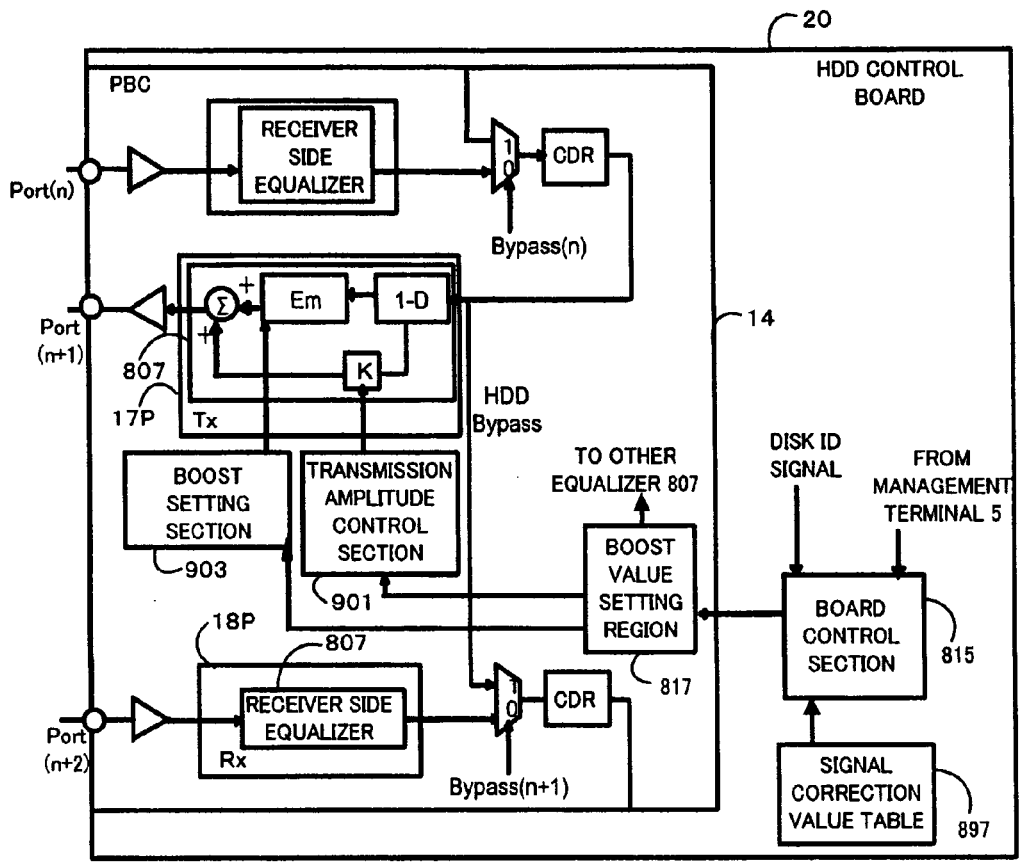

FIG.26B

| bit | Address10000 | Address10001 | | Addressx |
|---|---|---|---|---|
| 32 | Pre-Emph port16 | Pre-Emph port16 | | Pre-Emph port16 |
| 31 | Pre-Emph port16 | Pre-Emph port16 | | Pre-Emph port16 |
| ⋮ | ⋮ | ⋮ | ⋯ | ⋮ |
| 7 | Pre-Emph port3 | Pre-Emph port3 | | Pre-Emph port3 |
| 6 | Pre-Emph port3 | Pre-Emph port3 | | Pre-Emph port3 |
| 5 | Pre-Emph port2 | Pre-Emph port2 | | Pre-Emph port2 |
| 4 | Pre-Emph port2 | Pre-Emph port2 | | Pre-Emph port2 |
| 3 | Pre-Emph port1 | Pre-Emph port1 | | Pre-Emph port1 |
| 2 | Pre-Emph port1 | Pre-Emph port1 | | Pre-Emph port1 |
| 1 | Pre-Emph port0 | Pre-Emph port0 | | Pre-Emph port0 |
| 0 | Pre-Emph port0 | Pre-Emph port0 | | Pre-Emph port0 |

FIG.28

| DISK DRIVE INSTALLATION POSITION | WAVELENGTH ATTRIBUTE | BIT NO. | BOOST VALUE (dB) |
|---|---|---|---|
| 00 | ..... | ..... | ..... |
|  |  | ..... | ..... |
|  | ..... | ..... | ..... |
| ..... | ..... | ..... | ..... |

951

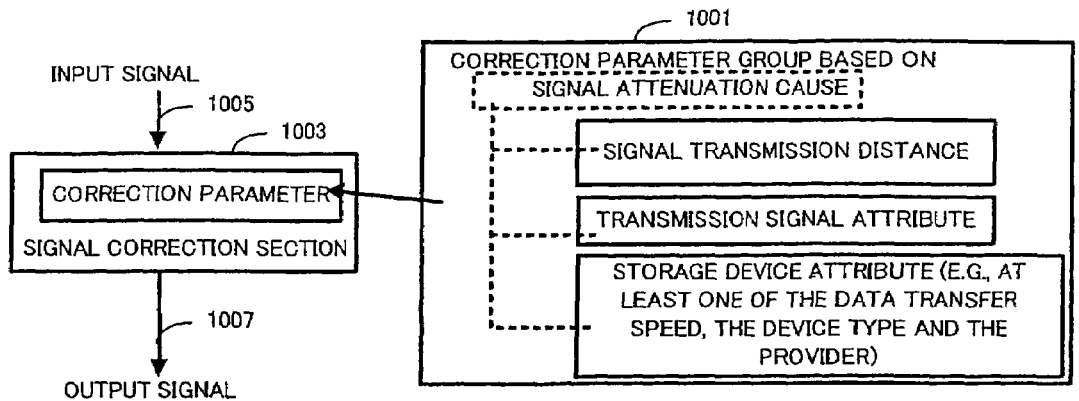
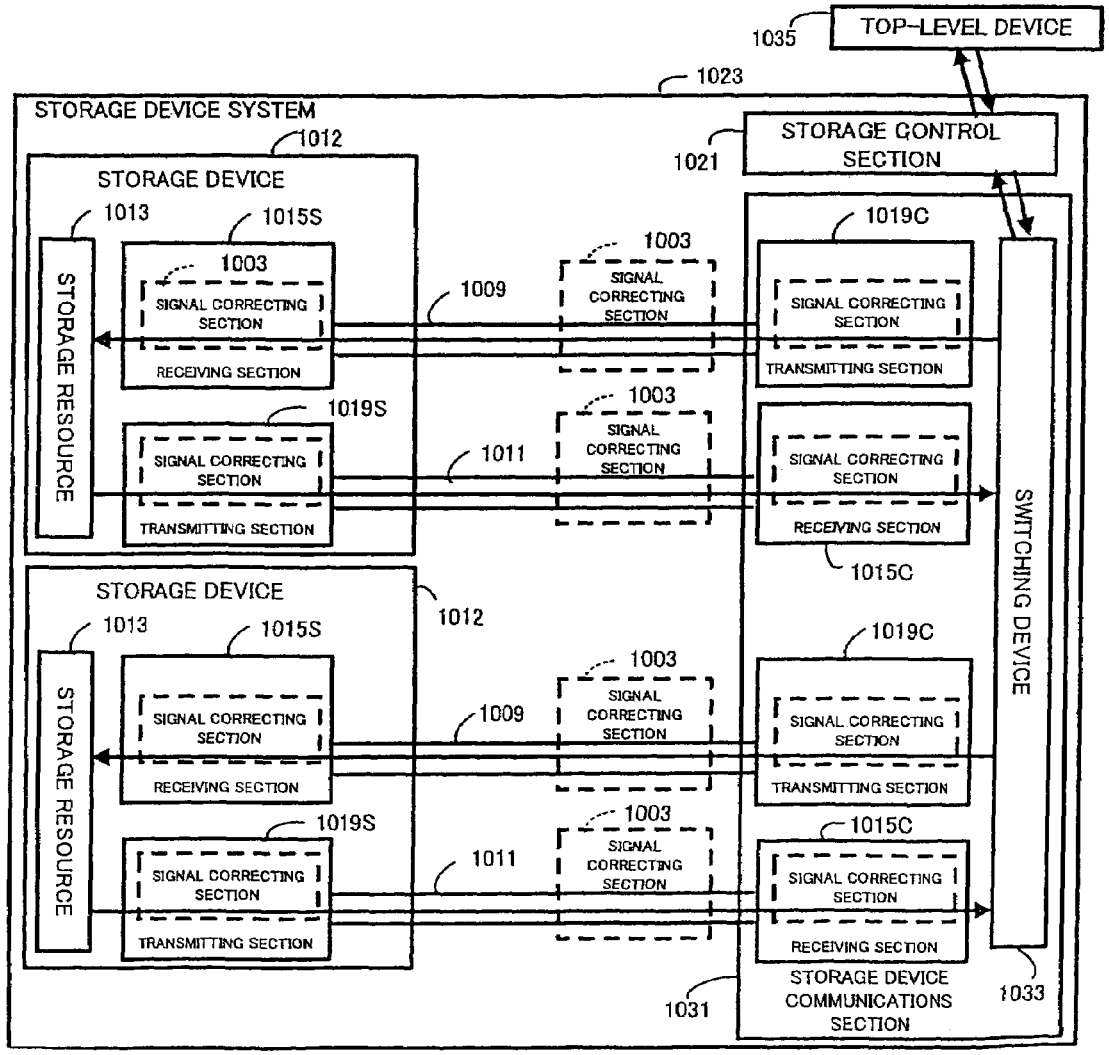

STORAGE DEVICE SYSTEM AND SIGNAL TRANSMISSION METHOD FOR STORAGE DEVICE SYSTEM

CROSS-REFERENCE TO PRIOR APPLICATION

This application relates to and claims priority from Japanese Patent Application Nos. 2004-222031, filed on Jul. 29, 2004 the entire disclosure of which is incorporated herein by reference.

FIELD OF THE INVENTION

The present invention relates to a storage device system, and more particularly, to a technology for transmitting signals to a plurality of storage devices installed in a storage device system.

BACKGROUND OF THE INVENTION

For example, as disclosed in Japanese Patent Laid-open No. 2000-347816, a disk array device provided with a fiber channel loop, a control device and a plurality of disk devices is known. The control device and the plurality of disk devices are connected to the fiber channel loop. The control device accesses any one of the plurality of disk devices, via the fiber channel loop.

SUMMARY OF THE INVENTION

It is known that in a FC-AL (Fiber Channel Arbitrated Loop), communications can be conducted at data transmission speeds of 1 Gbps (Gigabit per second) or 2 Gbps. It is also hoped that even faster communications, such as data transfer speeds of 4 Gbps, for example, can be achieved in a FC-AL. Furthermore, development of a HDD (hard disk device) for an FC system is also anticipated, namely, a hard disk device for connection to an FC-AL of this kind, which is capable transferring data at a speed of 4 Gbps, for example.

Furthermore, HDDs for serial interfaces are also known, such as an HDD for a SATA (Serial AT Attachment) system, and an HDD for a SAS (Serial Attached SCSI) system. One example of an HDD for a SATA system is known which is capable of transferring data at a speed of 1.5 Gbps, but it is hoped that HDDs for both SATA and SAS systems capable of even faster data transfer, such as data transfer speeds of 3 Gbps or above, will also be developed.

If it is supposed that HDDs capable of performing serial data transfer at high speeds of this kind are installed in a disk array device, and that the control device and the HDDs are connected via one or more printed circuit boards, then signal loss can be envisaged due to one or more than one problem, such as signal loss caused by the skin effect of the printed circuit boards or by dielectric loss, or signal loss caused by impedance mismatching of the interface connectors which connect the printed circuit boards with the HDDs. In particular, if it is sought to achieve high data transfer speeds such as those described above by means of serial transfer, then a high frequency signal exceeding 1 GHz is required. If the transmission frequency is less than 1 GHz, then signal attenuation will occur principally due to conductor loss, but if the frequency exceeds 1 GHz, then signal attenuation will occur principally due to dielectric loss. It is thought that the increase in dielectric loss in the printed circuit board becomes particularly problematic, if the transmission frequency exceeds 1 GHz in the signal path through the printed circuit board (for example, if the transmission frequency is 2 GHz or above). This is because if the dielectric loss increases, then the leakage current also increases, thus degrading the signal quality. Consequently, degradation of signal quality is expected to be a problem if an HDD capable of high-speed serial data transfer is installed in a disk array device.

Furthermore, normally, a plurality of HDDs are installed in a disk array device, and the length of the transmission path in the printed circuit board connecting the control device with the HDDs may be equal to or exceed a certain value (for example, 100 mm). Therefore, deterioration of the signal quality due to transmission loss is also thought to be a potential problem.

Moreover, users may also hope to install HDDs of different HDD types (for example, FC, SATA or SAS) and/or HDDs having different data transfer speeds in the same disk array device. However, if the HDDs are of different types or have different data transfer speeds, then the amount of attenuation caused by Inter Symbol Interference (ISI) during transmission will also be different in each HDD, and hence degradation of signal quality will also be problematic in cases such as this.

Furthermore, users may also hope to install HDDs from different providers (such as different manufacturers or vendors) (for example, HDDs from a different provider to the provider of the disk array device), in the disk array device. However, in this case, reflections may be produced by slight impedance mismatches in the impedance profile between the signal transmission paths in the printed circuit boards and the HDDs, and signal quality may also be degraded by these reflections. This becomes particularly notable, the higher the data transfer speed.

The problems described above are not limited to disk array devices provided with HDDs, and they may also appear in storage device systems provided with a plurality of storage devices of another type (such as DVD (Digital Versatile Disk) drives).

Therefore, it is an object of the present invention to prevent degradation of signal quality during transmission from or to a plurality of storage devices. More specifically, for example, one object of the present invention is to prevent degradation of signal quality during transmission from or to a plurality of storage devices using high-speed serial transfer, where dielectric loss is the dominant factor in signal degradation. It is also an object of the present invention to prevent degradation of signal quality during transmission to or from storage devices, even if the plurality of storage devices include storage devices having a transmission path which exceeds a prescribed length. It is also an object of the present invention to prevent degradation of signal quality during transmission to or from a plurality of storage devices having different storage device attributes (for example, at least one attribute out of the data transfer speed, the device type and the device provider).

Other objects of the present invention will become apparent from the following description.

The storage device system according to a first aspect of the present invention (hereinafter, called the "first storage device system") comprises: a plurality of signal transmission paths connected respectively to a plurality of installed storage devices; a plurality of system side communications sections for transmitting and receiving signals respectively to and from the plurality of storage devices, via the plurality of signal transmission paths; and one or a plurality of signal correcting sections for inputting a signal exchanged between the plurality of storage devices and the plurality of system side communications sections, correcting the input signal on the basis of a previously established correction parameter, and outputting the corrected signal. The correction parameter is a value set on the basis of at least one of the length of the signal transmission path between the storage device and the system side communications section, the wavelength attribute (for example, the signal waveform pattern) of the signal input to the signal correcting section, and the storage device attribute relating to the storage device.

In a first mode of the first storage device system, the correction parameter is a signal boost value. In this case, each of the plurality of signal correcting sections boosts at least one of a signal transmitted by the storage device, a signal transmitted by the system side communications section, and a signal passing through the signal transmission path, on the basis of the boost value, and then transmits the boosted signal.

More specifically, for example, the storage devices each comprise a storage device transmitting section for transmitting signals and a storage device receiving section for receiving signals. The system side communications sections comprise system signal transmitting sections for transmitting signals and system side receiving sections for receiving signals. The signal transmission paths comprise a first sub transmission path forming a signal transmission path between the storage device transmitting section and the system side receiving section, and a second sub signal transmission path forming a signal transmission path between the storage device receiving section and the system side transmitting section. The plurality of signal correcting sections are provided respectively in at least one of: the storage device transmitting section, the system side transmitting section, the first sub transmission path and the second sub transmission path, and they boost the input signal on the basis of the boost value and output the boosted value.

In a second mode of the first storage device system, in the first mode described above, the boost value is a value based on attenuation due to inter symbol interference corresponding to the length of the signal transmission path. In this case, for example, the signal correcting section boosts the amplitude of the shortest wavelength signal, on the basis of the boost value, in such a manner that it has the same amplitude upon reception as the amplitude of the longest wavelength signal upon reception, and it outputs the boosted signal.

In a third mode of the first storage device system, the storage device attribute is at least one of the data transfer speed, the type or the provider of the storage device.

In a fourth mode of the first storage device system, in the third mode described above, the data transfer speed is a speed based on the signal frequency, where dielectric loss is more dominant than conductor loss (for example, a speed at which it is desirable to transmit signals at a high frequency of this kind).

In a fifth mode of the first storage device system, the first storage device system further comprises: a storage device attribute determining section for determining the storage device attribute of the installed storage device, on the basis of the installation configuration of the storage device; a correction parameter storage region for storing a plurality of correction parameters corresponding respectively to a plurality of types of the storage device attributes, and a correction parameter setting section for setting a correction parameter corresponding to the determined storage device attribute, and stored in the correction parameter storage region, in the signal correcting section of the plurality of signal correcting sections that relates to the installed storage device.

In a fifth mode of the first storage device system, in the fourth mode described above, each of the plurality of storage devices is accommodated in a storage device casing, and is installed in the storage device system together with the storage device casing. The storage device casing comprises a casing connection section having a composition corresponding to the storage device attribute of the storage device accommodated in that storage device casing. The first storage device system comprises a system side connection section for connecting with the casing connection section. A storage device attribute identification signal having a waveform corresponding to the composition of the casing connection section is output when the casing connection section is connected to the system side connection section. The storage device attribute determining section determines the storage device attribute of the installed storage device, on the basis of the storage device attribute identification signal thus output.

The signal transmission method according to a second aspect of the present invention is a signal transmission method for a storage device system in which a plurality of storage devices can be installed. The storage device system comprises: a plurality of signal transmission paths connected respectively to the plurality of installed storage devices, and a plurality of system side communications sections for transmitting and receiving signals respectively to and from the plurality of storage devices, via the plurality of signal transmission paths. In this case, in the signal transmission method, the following steps (A) to (C) are implemented for each of the signal transmission paths; (A) a step of inputting a signal exchanged between a storage device and a system side communications section; (B) a step of correcting the input signal on the basis of a previously set correction parameter; and (C) a step of outputting the corrected signal. The correction parameter is a value established on the basis of any one of the length of the signal transmission path, the wavelength attribute of the input signal, and the storage device attribute relating to the storage device.

The storage device system according to a third aspect of the present invention is a storage device control board, being a printed circuit board to which a storage device installation board is connected, for controlling the plurality of storage devices via the storage device installation board; a plurality of transmission circuits, provided on the storage device control board, for transmitting signals to the plurality of storage devices, respectively, via a plurality of first signal transmission paths; a plurality of reception circuits, provided on the storage device control board, for receiving signals from the plurality of storage devices, respectively, via a plurality of second signal transmission paths; a plurality of signal correcting devices provided respectively in the plurality of transmission circuits; a boost value storage region for storing a plurality of signal boost values determined on the basis of the signal attenuation corresponding to at least one of the length of the first signal transmission path, the signal wavelength attribute, and a storage device attribute relating to the storage device; a boost value setting region in which at least one of the plurality of signal boost values stored in the boost value storage region is set; and a processor for setting at least one of the plurality of signal boost values stored in the boost value storage region, in the boost value setting region. The boost value setting region has a plurality of setting region addresses corresponding respectively to the plurality of transmission circuits. The processor sets, in each of the plurality of setting region addresses, the signal boost value to be used by the signal correction device provided in the transmission circuit corresponding to that setting region address, the signal boost value being determined on the basis of at least one of the length of the first signal transmission path for the signal transmitted by the corresponding transmission circuit, the wavelength attribute and the transmission destination of the signal from that transmission circuit. The signal correcting devices respectively input a signal, boost the input signal on the basis of the signal boost value set in the setting region address corresponding to the transmission circuit in which the signal correcting devices are provided, and output the boosted signal.

Each of the plurality of storage devices may be accommodated in a storage device casing, and may be installed in the storage device system together with the storage device casing. The storage device casing may comprise a casing connection section having a composition corresponding to the storage device attribute of the storage device accommodated in that storage device casing. The storage device installation board may comprise a plurality of system side connection sections for connecting with the casing connection section. A storage device attribute identification signal having a waveform corresponding to the composition of the casing connection section may be output when the casing connection section is connected to the system side connection section. The processor may determine the storage device attribute of a storage device that has been installed, and the position on the storage device installation board at which the storage device has been installed, on the basis of the output source and the waveform of the storage device attribute identification signal, and set a signal boost value corresponding to the storage device attribute thus determined in the setting region address corresponding to the transmission circuit which transmits signals to the storage device installed at the installation position thus determined.

BRIEF DESCRIPTION OF THE DRAWINGS

FIG. 2A is a general front side view of a disk drive frame 3a; FIG. 2B is a general cross-sectional view of a disk drive frame 3a; FIG. 2C is a general rear side view of a disk drive frame 3c;

FIG. 3A shows the connection layout between the disk control device 2 and the disk drive devices 3 in the disk array device 1; FIG. 3B shows the communication paths between the HDD control boards 20a and 20c in FIG. 3A and a plurality of canisters 4;

FIG. 5 shows an example of the connections between a DKA 10 and disk drives 4a;

FIG. 15A shows a general view of the front side of a plurality of disk drives 4a installed in a disk array device 1 according to a second installation method; FIG. 15B shows a general view of the side face of disk drives 4a installed according to a second installation method.

FIG. 25A shows an example of the composition of a canister relating to a third practical example of the first embodiment of the present invention; FIG. 25B is a block diagram-of the canister 4 shown in FIG. 25A; FIG. 25C shows an example of the composition of the signal correction value table 897;

FIG. 26A shows an example of the composition of an HDD control board 20 according to a third embodiment of the present invention; FIG. 26B shows one example of an address map of the boost value setting region 817;

FIG. 28 shows an example of the composition of a signal correction value table 951 in a case where all of the first to third embodiments are combined;

FIG. 29A shows a schematic view of one embodiment of the present invention; and FIG. 29B shows an example of the composition of an storage device system to which the concept of one mode of implementing the present invention is applied.

DETAILED DESCRIPTION OF THE PREFERRED EMBODIMENT

Figure 1:
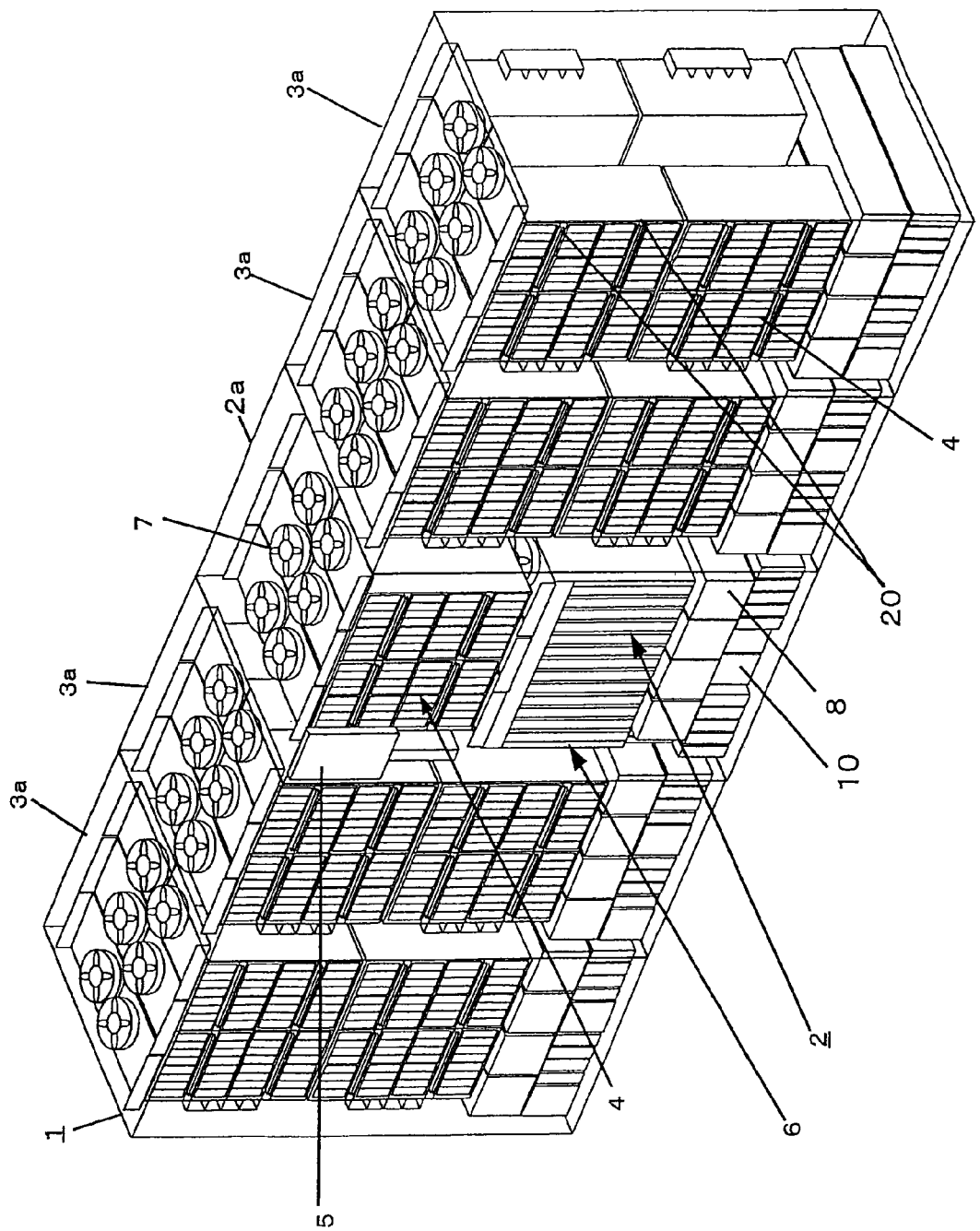
FIG. 1 shows an external view of the general composition of a disk array device relating to a first example of one mode of implementing the present invention.

Below, one mode of implementing the present invention is described with respect to the drawings.

FIG. 29A shows a schematic view of one mode of implementing the present invention.

A signal correction section 1003 is provided for outputting a signal obtained by correcting an input signal (voltage signal) 1005 as an output signal 1007. The signal correction section 1003 corrects the input signal 1005 by using a correction parameter set in a prescribed storage region (not labeled with a reference numeral). The correction parameter set in the prescribed storage region is a correction parameter selected from a correction parameter group 1001 on the basis of a signal attenuation cause. The correction parameter group 1001 comprises two or more correction parameter groups based on signal attenuation causes. More specifically, for example, the correction parameter group 1001 comprises two or more sub-groups corresponding to at least one of: a plurality of signal transmission distances (in other words, storage device installation positions), a plurality of transmission signal attributes, and a plurality of storage device attributes. One or more correction parameters are contained in each sub-group.

The correction parameter set in the prescribed storage region is a correction parameter corresponding to an attenuation cause relating to input signal or a signal that is to be output (for example, corresponding to at least one of the signal transmission distance, the transmission signal attribute or the storage device attribute), and it is selected from the correction parameter group 1001. The correction parameter may be selected by the user, or it may be selected on the basis of an identified signal attenuation cause, by means of the hardware, the computer program or a combination of same, identifying the signal attenuation cause.

FIG. 29B shows an example of the composition of an storage device system to which the concept of one mode of implementing the present invention is applied.

The storage device system 1023 comprises a plurality of storage devices 1012 (for example, two storage devices), a storage device communications section 1031, and a storage control section 1021.

Each of the storage devices 1012 comprises a storage resource (for example, a hard disk or DVD) 1013, and an interface section (not labeled with a reference numeral) corresponding to the storage resource 1013. The interface section comprises a receiving section 1015S for receiving a signal written to the storage resource 1013, and a transmitting section 1019S for transmitting a signal read out from the storage resource 1013.

The storage device communications section 1031 is connected to the plurality of storage devices 1012, either directly or indirectly (for example, via a printed circuit board). The storage device communications section 1031 is a printed circuit board, for example, and comprises (one or) a plurality of transmitting sections 1019C, (one or) a plurality of receiving sections 1015C, and a switching device 1033. A first signal transmission path 1009 is provided between the transmitting section 1019C and the receiving section 1015S of a storage device 1012, and a second signal transmission path 1011 is provided between the receiving section 1015C and the transmitting section 1019S of a storage device 1012. Copper wires may be used for the first signal transmission path 1009 and/or the second signal transmission path 1011.

The switch device 1033 is a switch for controlling the connection between the storage control section 1021 and the plurality of storage devices 1012, and is constituted by a fiber channel loop, for example.

The storage control section 1035 accesses any one of the plurality of storage devices 1012 via the switch device 1033, in accordance with a request from an upper-level device 1035, and it reads out data from the storage device or writes data to the storage device.

The signal correcting section 1003 described above may be located in various positions. For example, signal correcting sections 1003 may be installed in the transmitting sections 1019S, 1019C, in the receiving sections 1015S, 1015C, in the signal transmission paths 1009 and/or 1011, in the transmitting sections 1019S and receiving sections 1015S (in other words, in the storage devices 1012), and/or in the transmitting sections 1019C and receiving sections 1015C (in other words, in the storage device communications section 1031).

Moreover, while signal correcting sections 1003 may be installed in a variety of positions in this way, they may be of the same composition wherever they are positioned, or they may be of different compositions, depending on their location and the correction parameter. Furthermore, the correction parameter established with respect to each signal correcting section 1003 differs according to the attenuation cause relating to the signal input to or output from that signal correcting section 1003.

The foregoing provides one example of the composition of a storage device system 1023. A plurality of either transmitting sections 1019S and/or receiving sections 1015S may be provided in each storage device 1012. Moreover, a plurality of receiving sections 1015S may be connected to each transmitting section 1019C, and a plurality of transmitting sections 1019S may be connected to each receiving section 1015C. Similarly, a plurality of receiving sections 1015C may be connected to each transmitting section 1019S, and a plurality of transmitting sections 1019C may be connected to each receiving section 1015S.

Below, several embodiments relating to the present mode of implementing the invention are described.

Embodiment 1

FIG. 1 shows an external view of the general composition of a disk array device relating to a first embodiment of one mode of implementing the present invention.

The disk array device 1 comprises a controller frame 2a capable of accommodating a disk control device 2 and a canister 4 in a central position, and disk drive frames 3a capable of accommodating canisters 4, to the left and right-hand sides of the controller frame 2a. The canisters 4 contain disk drives. For the disk drives, it is possible to use various types of device, such as a hard disk drive (HDD), or a semiconductor storage device, or the like. The controller frame 2a corresponds to the basic frame and the disk drive frames 3a are so-called expansion frames, which may not be provided at all, or which may be provided in plural fashion.

The control frame 2a controls the disk array device 1. The control frame 2a comprises, for example, a management terminal 5, a disk control device 2, cooling fans 7, a power supply unit 8, a battery, an AC box 10, an HDD control board 20, and the like.

The management terminal 5 can be located in various positions, such as the front face of the controller frame 2a, for example. The management terminal 5 is, for example, a notebook computer, comprising a display device and a keyboard device which can be folded together and closed. By using this management terminal 5, an operator is able to maintain and manage the disk array device 1.

The disk control device 2 is a machine for controlling the whole disk array device 1, and it comprises a plurality of control boards 6. The control boards 6 are, for example, circuits formed by providing circuit elements on a printed circuit board, and they constitute, for example, channel adapters (channel control sections), disk adapters (disk control sections), cache memories, shared memories, or the like, as described hereinafter.

The cooling fans 7 are used to cool the disk control device 2 and the disk drives.

The power supply unit 8 supplies a prescribed electric power to at least one of the plurality of constituent elements which make up the disk array device 1. In this way, the disk array device 1 can be driven. The PBC (Port Bypass Circuit) board 20 is described hereinafter.

A plurality of canisters 4 (in other words, a plurality of disk drives) are provided in each disk drive frame 3a. FIG. 2A, FIG. 2B and FIG. 2C show the appearance of a disk drive frame 3a.

FIG. 2A is a general front side view of a disk drive frame 3a. FIG. 2B is a general cross-sectional view of a disk drive frame 3a. FIG. 2C is a general rear side view of a disk drive frame 3c.

As shown in FIG. 2A, for example, one or a plurality of disk drive devices 3 are provided in the disk drive frame 3a. Each disk drive device 3 comprises, for example, a plurality of canister groups 41, 42, 43 and 44, and a plurality of HDD control boards 20a, 20b, 20c and 20d corresponding respectively to this plurality of canister groups 41, 42, 43 and 44. As shown in FIG. 2B, the plurality of HDD control boards 20a, 20b, 20c and 20d are connected to one (or a plurality of) back plane boards (for example, printed circuit boards) 22. As shown in FIG. 2B, the back plane boards 22 are connected to the disk drives 4a in a plurality of canisters 4 contained in the respective canister groups 41, 42, 43 or 44.

The canisters 4 are not only stored on the front side of the disk array device 1 (in other words, the same side as the management terminal 5), but also on the rear side, as illustrated in FIG. 2C.

The foregoing description gave an outline of the composition of the disk array device 1, but the composition of the disk array device 1 and the location of the constituent elements of same are not limited to the description given here. For example, the management terminal 5 does not need to be incorporated into the disk array device 1, and it may also be a computer that is connected to the disk array device 1 by means of a communications network. Furthermore, the management terminal 5 is not limited to being a notebook type computer, and it may also be a desktop computer, for example. Furthermore, the disk control device 2 and the disk drive devices 3 may be formed in an integrated fashion. Moreover, an LED (light-emitting diode) display section may be provided on the front face or rear face of the disk array device 1, and the operational status of the respective disk drives 4a may be displayed by means of LEDs switching on or off, for example.

FIG. 3A shows the connection layout between the disk control device 2 and the disk drive devices 3 in the disk array device 1. FIG. 3B shows the communication paths between the HDD control boards 20a and 20c in FIG. 3A and the plurality of canisters 4. In the following description, the term "fiber channel" is abbreviated to "FC". Furthermore, the term "HDD control board 20" is taken to indicate at least one of the plurality of HDD control boards 20a, 20b, 20c and 20d, or an HDD control board other than these.

A plurality of disk adapters (hereinafter, abbreviated to "DKA") 10 are provided in the disk control device 2, for example. Each pair DKA 10 and DKA 10 of the plurality of DKAs 10 constitutes a cluster, for example (in other words, there is a dual access system to each of the disk drives 4a), and if a fault occurs in one DKA 10 and that DKA 10 becomes unable to access a certain disk drive 4a, then the other DKA 10 can access that disk drive 4a.

Two or more of the plurality of HDD control boards 20 provided in the disk array device 1 are connected in series, via FC cables (metal cables, such as copper cables, for example) 13a. The foremost HDD control board 20 of the two or more HDD control boards 20 connected in series is connected to the DKA 10, via an FC cable 13a. By this means, an FC loop conforming to FC-AL (Fiber Channel Arbitrated Loop) standards is formed. A plurality of FC loops are provided in the disk array device 1, and a plurality of disk drives 4a are connected to each FC loop, by means of the back plane board 22 (see FIG. 2B), which is not illustrated in FIG. 3A and FIG. 3B. Each DKA 10 is able to access any of the plurality of disk drives 4a connected to the FC loop to which it is connected, via that FC loop.

In this embodiment, the disk drives 4a are HDDs (hard disk drives). As shown in FIG. 3B, FC HDDs may be used as the HDDs 4a, or SATA HDDs or SES HDDs may be used.

An FC HDD is an HDD composed in such a manner that it can be connected to an FC-AL, in accordance with fiber channel (FC) standards, and it has a data transfer speed of 1 Gbps-2 Gbps, for example. As shown in FIG. 3B, the plurality of canisters 4 include canisters 4F of a type installed with an FC HDD of this kind. A DC/DC converter 4b, for example, is also installed in this canister 4F, in addition to the FC HDD. The DC/DC converter 4b lowers the DC voltage supplied from an external source and applies it to the FC HDD.

A SATA (Serial AT Attachment) HDD is an HDD 4 which uses a serial transfer method instead of the parallel transfer method employed in ATA specifications, and it has a data transfer speed of 1.5 Gbps, for example. The SES (SCSI Enclosure Service) HDD is a disk drive capable of communicating with the DKAs 10 and power controller (not illustrated) controlling the power supply to the HDD 4a. It has SES or ESI (Enclosure Service I/F) functions as specified in the SCSI3 (Small Computer System Interface 3) specifications. As shown in FIG. 3B, the plurality of canisters 4 include canisters 4S of a type installed with a SATA HDD or SES HDD of this kind. In addition to the SATA HDD or SES HDD, the canister 4S is fitted with a conversion board 4c for converting data to a data format which corresponds to the SATA HDD or SES HDD, and a data format which corresponds to the FC. The SATA HDD or SES HDD are connected to the FC-AL via the conversion board 4c. The SATA HDD may also be a SAS (Serial Attached SCSI) HDD.

Figure 4:
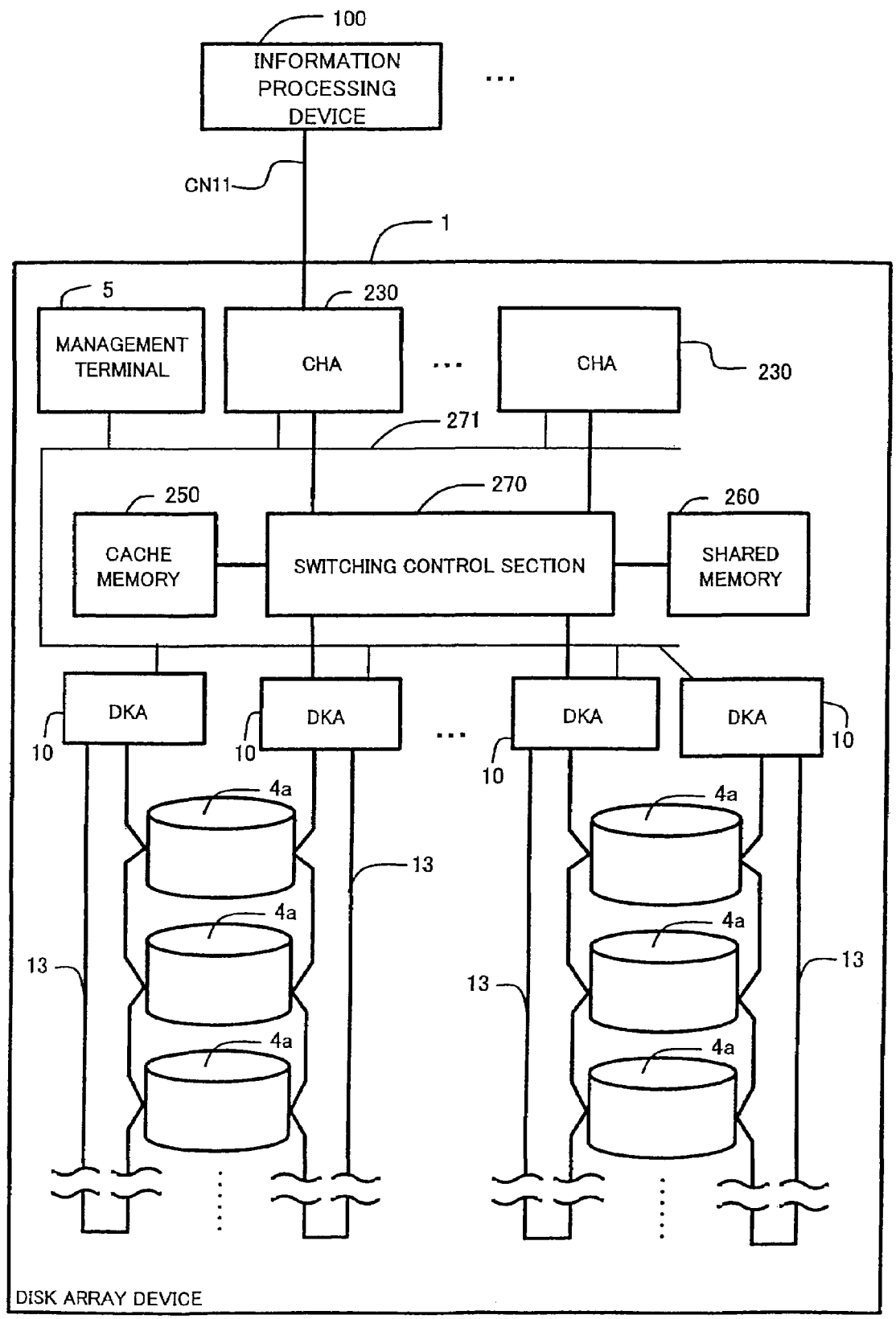
FIG. 4 is a block diagram showing an example of the composition of a disk array device 1.

FIG. 4 is a block diagram showing an example of the composition of a disk array device 1.

The disk array device 1 comprises (one or) a plurality of channel adapters (hereinafter, abbreviated to "CHA") 230, a plurality of DKAs 10, a cache memory 250, a shared memory 260, a switching control unit 270, and a management terminal 5.

The CHAs 230 are connected to an information processing device 100 via a communications network CN 11, and they control data transfer to and from the information processing device 100. Each CHA 230 may be constituted by a microcomputer system comprising a CPU, ROM, RAM, and the like. The CHA 230 may have a composition which corresponds to the type of information processing device 100. The communications network CN11 may be a network such as the Internet, a SAN (Storage Area Network), a LAN (Local Area Network), a WAN (Wide Area Network), a MAN (Metropolitan Area Network), or the like. The information processing device 100 may be a computer device comprising a CPU, a memory, and the like, (such as a personal computer or server, for example), or it may be another disk array device.

Each DKA 10 may be constituted by a microcomputer system comprising a CPU, ROM, RAM, and the like, for example. A plurality of disk drives 4a are connected to the DKA 10, via an FC loop 13. The DKA 10 controls the transmission and reception of data to and from each of the disk drives 4a. The DKA 10 also transfers data at block level, between the disk drives 4a, via an FC loop 13, on the basis of a prescribed communications protocol (for example, SCSI). The data transfer speed in the FC loop 13 is, for example, a high data transfer speed at which dielectric loss is a dominant factor. More specifically, the data transfer speed is 1 Gbps or 2 Gbps, for example.

The cache memory 250 may be constituted by a volatile or a non-volatile semiconductor memory, for example. The cache memory 250 stores data received from the information processing device 100 and data read out from the disk drives 4a.

The shared memory 260 may be constituted by a non-volatile or volatile semiconductor memory, for example. The shared memory 260 stores, for example, various commands received from the information processing device 100, and control information used to control the disk array device 1. These commands and control information, and the like, may be stored in a redundant fashion, by means of a plurality of shared memories 260. The cache memory 250 and the shared memory 260 may be constructed as mutually separate memories, or alternatively, a portion of a single memory may be used as a cache memory region and the remaining portion of the memory may be used as a shared memory region.

The switching control section 270 is connected respectively to the various DKA10, the CHAs 230, the cache memory 250, and the shared memory 260. The switching control section 270 may be constituted by an ultra-high-speed cross-bar switch, or the like, for example.

The management terminal 5 gathers and monitors the statuses of the respective sections of the disk array device 1 (for example, the CHA 230 and the DKA 10), via an internal network (for example, a LAN) 271. The management terminal 5 may output the gathered data directly, as raw data, or as processed statistical data, to an external management terminal (not illustrated). Examples of information which may be gatherable by the management terminal 5 include: the device composition, power supply alarms, temperature alarms, or the like.

Next, one example of the processing carried out by the disk array device 1 will be described. The CHA 230 receives a write command and data to be written (write data), from the information processing device 100, via the communications network CN11. The CHA 230 stores the received write command in the shared memory 260, and it stores the received write data in the cache memory 250. The DKA 10 refers to the shared memory 260 at regular intervals. If the DKA 10 discovers an unprocessed write command stored in the shared memory 260, then in accordance with the write command thus discovered, it reads out the write data from the cache memory 250, and transfers the write data thus read out to at least one disk drive 4a of the plurality of disk drives 4a connected to the FC loop 13, via the FC loop 13.

Next, a further example of processing carried out by the disk array device 1 will be described. The CHA 230 receives a read command from the information processing device 100 and stores that read command in the shared memory 260. If the DKA 10 has discovered an unprocessed read command in the shared memory 260, then it reads out data from the respective disk drives 4a having the logical volume indicated by the read command, via the FC loop 13. The DKA 10 stores the data thus read out in the cache memory 250. Furthermore, the DKA 10 also sends a report indicating that data read-out in accordance with the read command has been completed, to the CHA 230, via the shared memory 260. Upon receiving this report, the CHA 230 reads in the data from the cache memory 250 and transmits it to the information processing device 100.

The foregoing description related to one example of the composition and operation of the disk array device 1. The CHA 230, DKA 10, cache memory 250 and shared memory 260 do not have to be provided separately, as in this embodiment, and they may also be constituted in an integrated fashion, for example. Furthermore, it is also possible for any combination of these elements to be constituted in an integrated fashion. Moreover, the CHA 230, DKA 10, cache memory 250 and shared memory 260 may be connected via a bus, or they may be connected by a network, such as a LAN.

Figure 5:
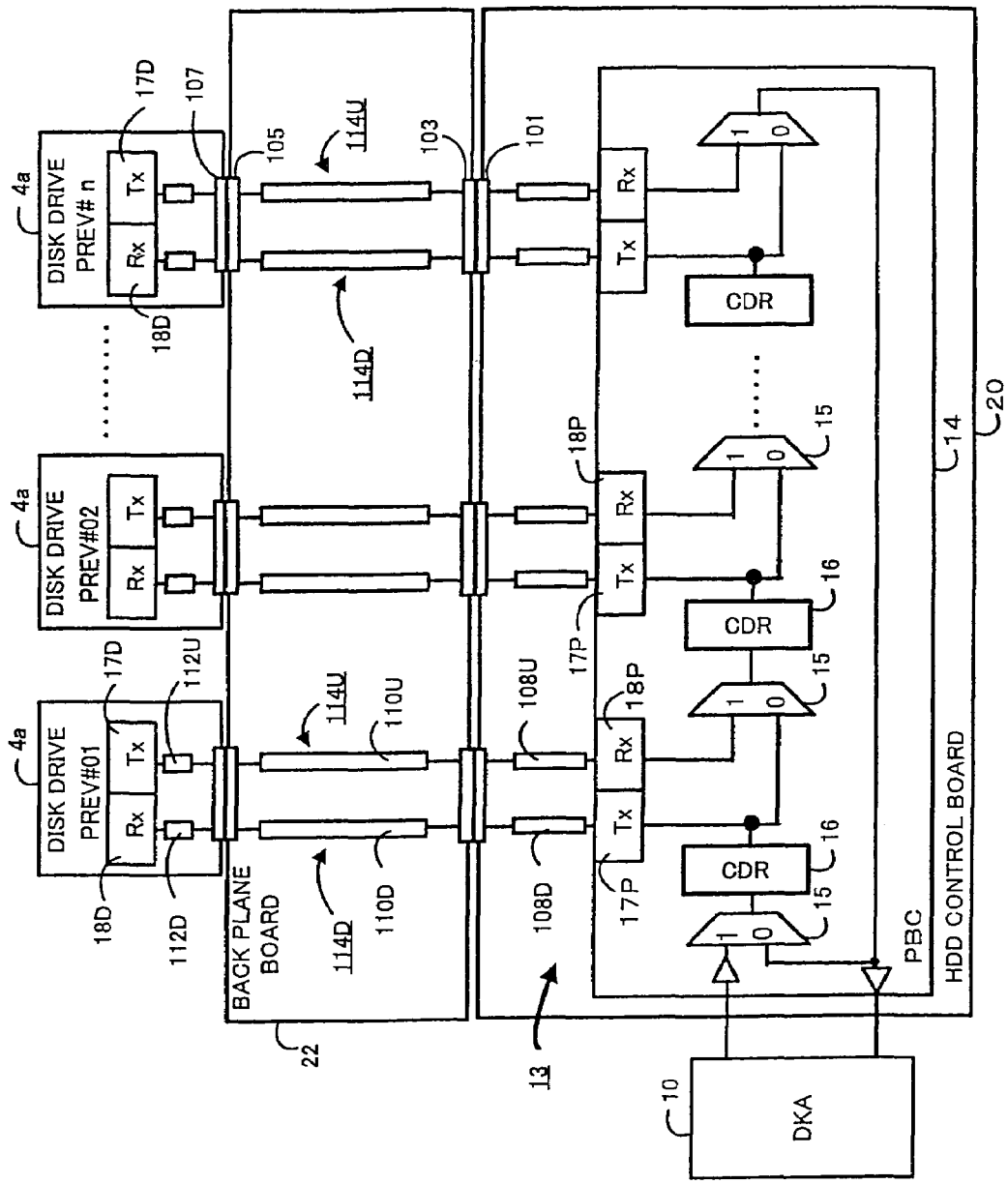

FIG. 5 shows an example of the connections between a DKA 10 and disk drives 4a.

An HDD control board 20 and a back plane board 22 are interposed between the DKA 10 and the plurality of disk drives 4a. Specifically, the DKA 10 is connected to the HDD control board 20, the HDD control board 20 is connected to the back plane board 22, and a plurality of disk drives 4a are connected to the back plane board 22. More specifically, the HDD control board 20 comprises a plurality of connectors 101, and this plurality of connectors 101 are connected to a plurality of first connectors 103 provided on the back plane board 22, thereby connecting the HDD control board 20 to the back plane board 22. Furthermore, each of the disk drives 4a comprises a connector 107 and this connector 107 is connected to a second connector 105 provided on the back plane board 22, thereby connecting the plurality of disk drives 4a to the back plane board 22. By providing connections in this manner, a downstream transmission path 114D forming a transmission path for a voltage signal transmitted from the PBC 14 on the HDD control board 20 to the disk drive 4a, and an upstream transmission path 114U forming a transmission path for a voltage signal transmitted from the disk drive 4a to the PBC 14, are formed between the PBC 14 on the HDD control board 20 and each of the respective disk drives 4a. The downstream transmission path 114D is a transmission path of a prescribed material (for example, copper wire or other metal wire), and it is constituted by a first downstream transmission path element 112D, a second downstream transmission path element 110D and a third downstream transmission path element 108D (respectively described hereinafter), which are connected in series. The upstream transmission path 114U is a transmission path of a prescribed material (for example, copper wire or other metal wire), and it is constituted by a first upstream transmission path element 112U, a second upstream transmission path element 110U and a third upstream transmission path element 108U (respectively described hereinafter), which are connected in series.

The disk drive 4a comprises a reception circuit 18D for receiving a voltage signal, and a transmission circuit 17D for transmitting a voltage signal. The first downstream transmission path element (for example, copper wire or other metal wire) 112D is situated between the connector 107 and the reception circuit 18D, and the first upstream transmission path element 112U is situated between the connector 107 and the transmission circuit 17D. The connector 107 may be the connector the disk drive 4a itself, as in the case of an FC HDD, for example, or it may be the connector of a conversion board 4c (see FIG. 3B) connected to the disk drive 4a, as in the case of a SATA HDD, for example. Furthermore, markings such as "PREV#n" shown in FIG. 5 indicate the positions of the disk drives in the FC loop 13.

The back plane board 22 is a printed circuit board on which prescribed wiring patterns are formed, for example, and it comprises a plurality of first connectors 103 and a plurality of second connectors 105. The wiring patterns are formed from a prescribed material (for example, a metal) and more specifically, copper, for instance. The second downstream transmission path element 110D and the second upstream transmission path element 110U are situated between the respective first connectors 103 and the respective second connectors 105.

The HDD control board 20 is a printed circuit board on which a prescribed wiring pattern is formed, for example, and it controls the plurality of disk drives 4a connected via the back plane board 22. The wiring patterns are formed from a prescribed material (for example, a metal) and more specifically, copper, for instance. The HDD control board 20 comprises a plurality of connectors 101 and a PBC 14.

The connector 101 is connected to the transmission circuit 17P (described hereinafter) via the third downstream transmission path element (for example, copper wire) 108D, and it is connected to the reception circuit 18P (described hereinafter) via the third upstream transmission path element (for example, copper wire) 108U.

The PBC 14 is a printed circuit board on which a prescribed writing pattern is formed, for example, and it comprises a plurality of transmission circuits 17P, a plurality of reception circuits 18P, a plurality of multiplexers 15, and a plurality of CDRs (Clock Data Recovery) circuits 16. The wiring patterns are formed from a prescribed material (for example, a metal) and more specifically, copper, for instance. The plurality of multiplexers 15 include those connected to the transmission circuit 17P and the reception circuit 18P and those connected to the DKA 10. The CDR circuit 16 is a circuit for restricting disturbance (for example, jitter) in the input data. The input terminal of the CDR circuit 16 is connected to the output terminal of the multiplexer 15, and the output terminal of the CDR circuit 16 is connected to a transmission circuit 17P and the input terminal of the multiplexer 15 on the side indicated by "0".

If the disk drive 4a is connected to the multiplexer 15, then a selection signal is input in such a manner that the input on the side of the multiplexer 15 indicated by "1" is selected. If the disk drive 4a is not connected to the multiplexer 15, then a selection signal is input in such a manner that the input on the side of the multiplexer 15 indicated by "0" is selected.

If there is a fault in the disk drive 4a, for example, then the PBC 14 is able to separate the disk drive 4a containing the fault, from the FC loop 13. An instruction to separate the disk drive 4a containing the fault from the FC loop 13 can be issued by the DKA 10. This instruction can be transmitted by means of the FC loop 13, for example, or by using the signal line (not illustrated) connecting the DKA 10 and the PBC 14. If it is detected that a fault has occurred in one of the disk drives 4a, then a selection signal is input so as to select the input on the side indicated by "0" of the multiplexer 15 connected to that disk drive 4a. The selection signal can be input to the respective multiplexers 15 by means of the DKA 10, the disk drive (for example, the SES HDD) 4a and the CDR circuit 16 which are connected to that multiplexer 15, or it may be input solely by the DKA 10.

The number of multiplexers 15 provided by the PBC 14 is not limited to the example shown in FIG. 5. For example, in the disk drive device 3 shown in FIG. 2A, FIG. 2B and FIG. 2C, if one PBC 14 is provided for each set of 16 disk drives 4a arrayed in one horizontal row, then it may be necessary to provide at least 17 multiplexers 15 in one PBC 14 in order to permit construction of an FC loop 13 by connecting one DKA 10 with the maximum number of (namely, 16) disk drives 4a.

Furthermore, the CDR circuit 16 may be constructed integrally with the PBC 14. For example, in the PBC 14 shown in FIG. 5, a CDR circuit 16 connected to the left and right-hand end multiplexers 15 may be formed on the PBC 14.

In the composition described above, if data is exchanged between the DKA 10 and any of the disk drives 4a, the reception circuit 18D of that disk drive 4a receives a voltage signal from the transmission circuit 17P connected to that reception circuit 18D, via the downstream transmission path 114D, and the transmission circuit 17D of that disk drive 4a transmits a voltage signal to the reception circuit 18P connected to that transmission circuit 18D, via the upstream transmission path 114U.

If, for example, both the downstream transmission path 114D and the upstream transmission path 114U are made from copper wire, and it is sought to achieve high-speed data transfer via these copper wires (for example, data transfer at a speed of 3 Gbps or above), then serious obstacles arises, namely (1) and (2), for example:

(1) signal loss caused by skin effects and dielectric loss in the printed circuit board forming the HDD control board 20 and the back plane board 22; and (2) signal loss caused by impedance mismatching between the connectors 101, 103 connecting the HDD control board 20 to the back plane board 22, and the disk drives 4a to the back plane board 22.

Figure 6A:
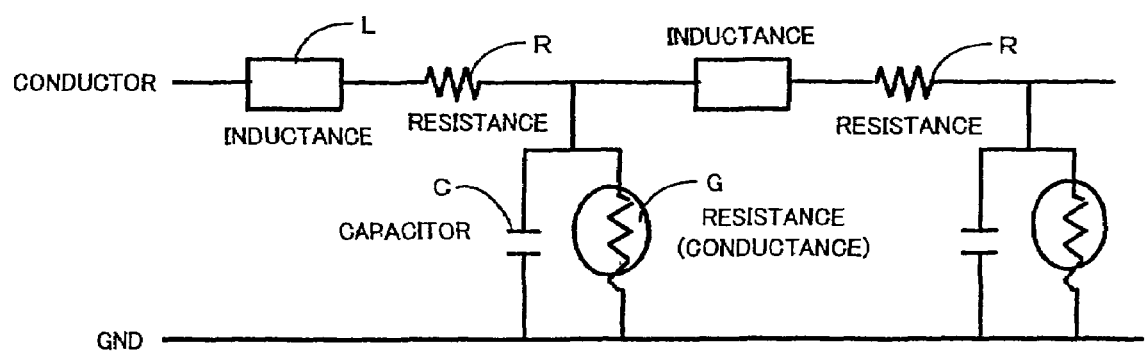
FIG. 6A shows an equivalent circuit illustrating dielectric loss.

In particular, if the transmission frequency exceeds a prescribed value (for example, 1 GHz) in the signal transmission paths 114D and 114U on the printed circuit boards 20 and 22, then the dielectric loss in the printed circuit boards 20 and 22 will be the dominant factor in signal loss. According to the equivalent circuit for dielectric loss illustrated in FIG. 6A, the resistance R causing the skin effect is connected in series to the inductance L, and a leak conductance G causing the dielectric tangent (tan δ) is connected in parallel to the capacitance C. It can be seen that the dielectric loss is induced by increase in the leakage current.

Figure 6B:
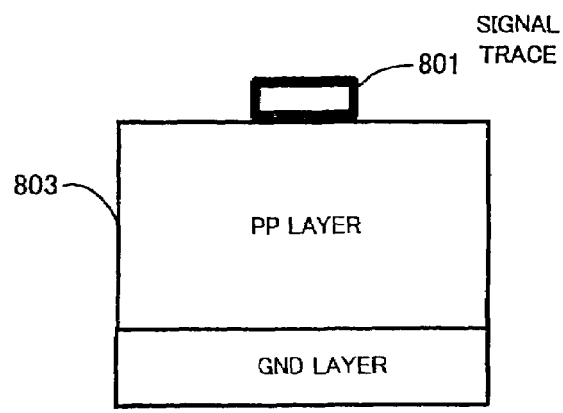
FIG. 6B shows one example of the aspect of a printed circuit board 803.
Figure 7:
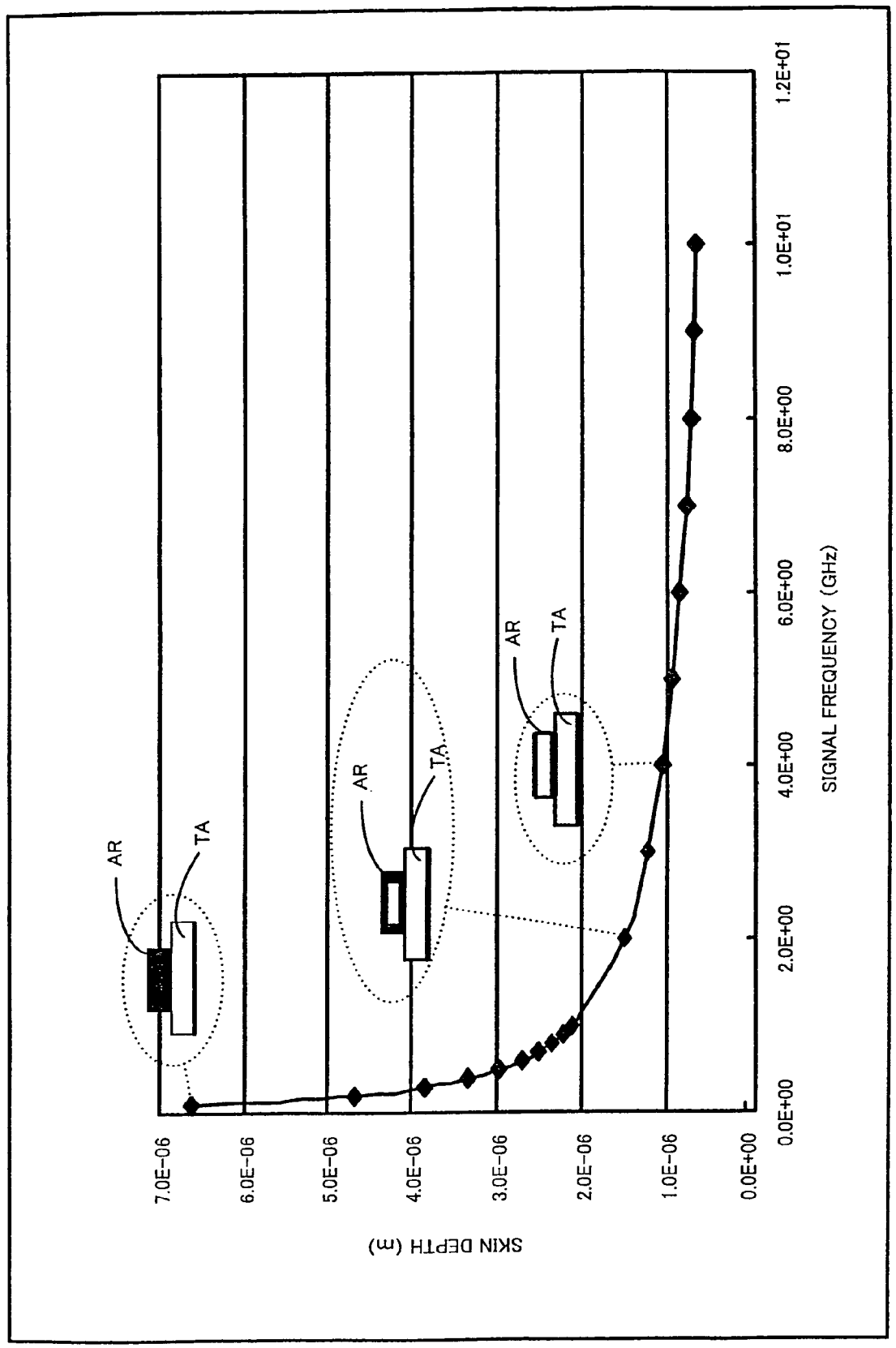
FIG. 7 shows a graph indicating the characteristics of skin effect against frequency.

Furthermore, FIG. 6B shows one example of a printed circuit board 803 (for example, a back plane board 22), and since loss occurs when electrical charge accumulates in the capacitor (for example, the polypropylene layer (PP layer)) between the conductor of the transmission path (signal line) and the internal ground (GND layer) of the printed circuit board 803, making it difficult for current to flow in the conductor, then the logarithm of the signal attenuation per unit length of the signal transmission path will increase in direct proportion with the logarithm of the frequency. This relationship, in other words, the characteristics of the skin effect with respect to the frequency, is illustrated in a graph in FIG. 7. The reference symbol "AR" of the blacked-in section in FIG. 7 indicates the region where the signal current flows in the copper wire, and the reference symbol "TA" indicates a printed circuit board made from a glass epoxy resin (FR-4) insulating material. As FIG. 7 reveals, as the frequency increases, so the current concentrates increasingly in the surface of the conductor only, and consequently, it becomes more difficult for the current to flow in the conductor (in other words, the conductor loss increases). If the depth of the surface layer in which the current flow is taken to be δ, and the frequency is taken to be f (MHz), then δ is inversely proportional to $\sqrt{F}$. In other words, in a low-frequency signal, the current is able to flow through the whole cross-section of the conductor, but in a high-frequency signal, the current only flows in the surface portion of the conductor. Even if a signal trace is transmitted, degradation is much more severe in the case of a low-frequency signal, than in the case of a high-frequency signal.

Figure 8:
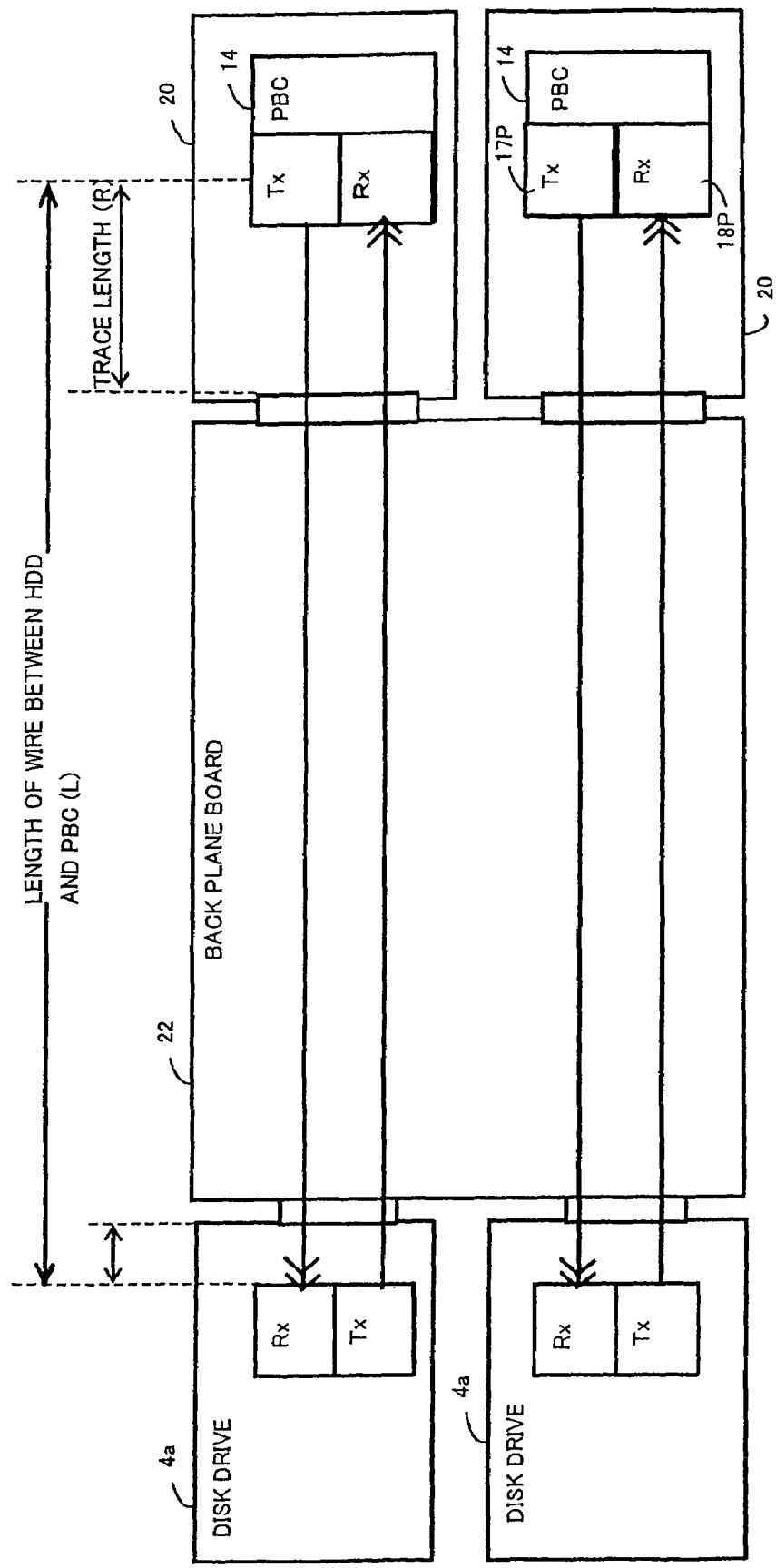
FIG. 8 shows an example of a definition of the line of the wire between the PBC and the HDD.

The length L of the wire between the PBC and the HDD and the trace length R1 are defined as shown in FIG. 8. More specifically, the length L of the wire between the PBC and the HDD is the length of the downstream transmission path 114D (or the upstream transmission path 114U), plus a portion (or all) of the length of the reception circuit 18P (or the transmission circuit 17P) provided in the PBC 14. Furthermore, the trace length R is the length of the third downstream transmission path element 108D (or the third upstream transmission path element 108U), plus a portion (or all) of the length of the reception circuit 18P (or the transmission circuit 17P).

Figure 9:
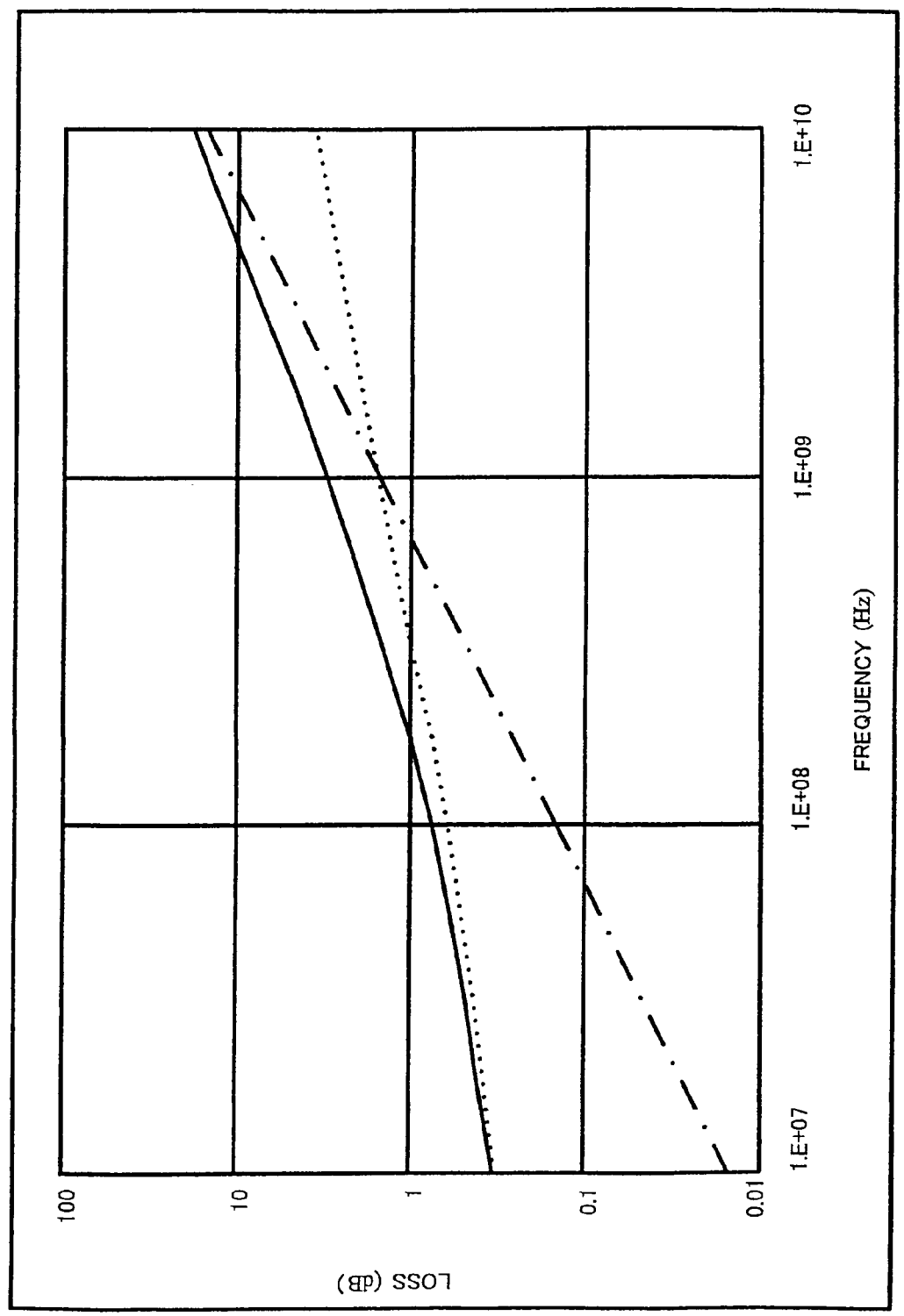
FIG. 9 shows a graph indicating the characteristics of signal loss against frequency.

The characteristics of the signal loss with respect to the frequency in this case are shown in a graph in FIG. 9. FIG. 9 shows a case where the trace length R is 50 cm, the pattern width and the pattern length of the conductor (for example, the copper wire), on the printed circuit board 803 (see FIG. 6B) are both 100 μm, and the dielectric tangent tan δ (the ratio between the leakage conductance G and ωC) is 0.02.

The dotted line indicates the signal attenuation (signal loss) due to conductor loss (resistance loss), and the dot and dash line indicates the signal attenuation due to dielectric loss, and the solid line indicates the signal attenuation due to both conductor loss and dielectric loss. According to the characteristics graph shown in FIG. 9, in the region where the transmission frequency is less than 1 GHz, the conductor loss is a more dominant factor in signal attenuation than the dielectric loss, but when the frequency is greater than 1 GHz, the signal attenuation due to dielectric loss is greater than that due to conductor loss. Moreover, it can also be seen that the difference between the respective attenuations increases, as the frequency rises further.

Figure 10A:
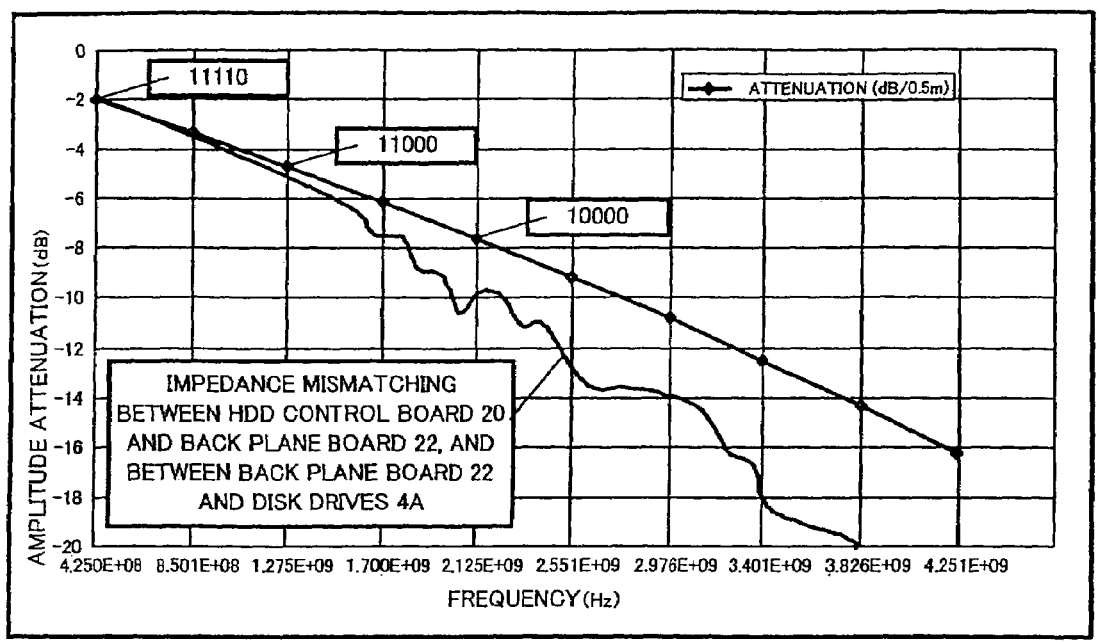
FIG. 10A is a graph showing an example of the characteristics of signal loss against transfer speed.
Figure 10B:
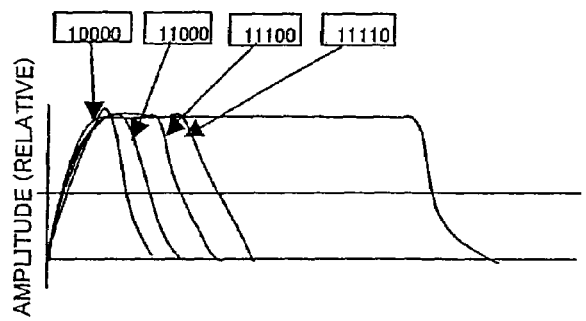
FIG. 10B shows the signal amplitude of a data pattern transmitted by the disk drive 4a or the PBC 14.
Figure 10C:
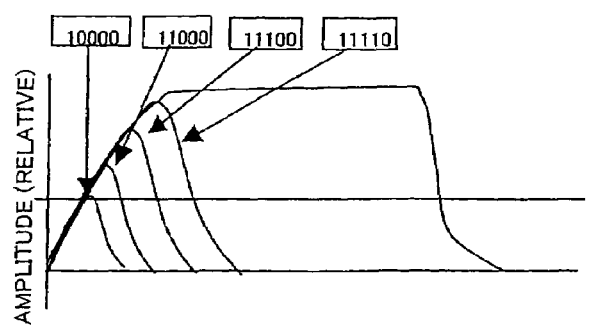
FIG. 10C shows the signal amplitude of a data pattern received by the disk drive 4a or the PBC 14.

FIG. 10A is a graph showing an example of the characteristics of signal loss against transfer speed. FIG. 10B shows the signal amplitude of a data pattern transmitted by the disk drive 4a or the PBC 14. FIG. 10C shows the signal amplitude of a data pattern received by the disk drive 4a or the PBC 14. The graph shown in FIG. 10A indicates simulation results for a case where the printed circuit board 203 (for example, PBC 14) is made from a glass epoxy resin (FR-4), and the trace length R is 50 cm. Furthermore, the vertical axis indicates the attenuation in the amplitude, per 0.5 m of the wire length.

The phenomenon described above, namely, the fact that dielectric loss is the principal cause of signal loss, is particularly notable as the transmission rises in excess of 1 Gbps. This phenomenon is equivalent to passing the signal through a so-called low-pass filter, and hence the rise of the bandwidth-restricted pulse is blunted, and the shortest wavelength component in the data (for example, "10000") is attenuated with respect to the longest wavelength component (for example, "11110"), as shown in FIG. 10A. Moreover, this attenuation causes the ISI (Inter Symbol Interference) to increase, and furthermore, jitter also increases due to the degradation of the S/N ratio caused by signal attenuation at the shortest wavelength. Furthermore, reflection occurs due to impedance mismatching between the second connector 105 of the back plane board 22 and the connector 107 of the disk drive 4a. Moreover, the bit error rate (BER) falls due to decline in the opening ratio of the eye pattern.

Furthermore, according to FIG. 10B and FIG. 10C, it can be seen that the attenuation in the signal amplitude of the data received via the downstream transmission path 114D or the upstream transmission path 114U varies depending on the transmitted data pattern.

Figure 11A:
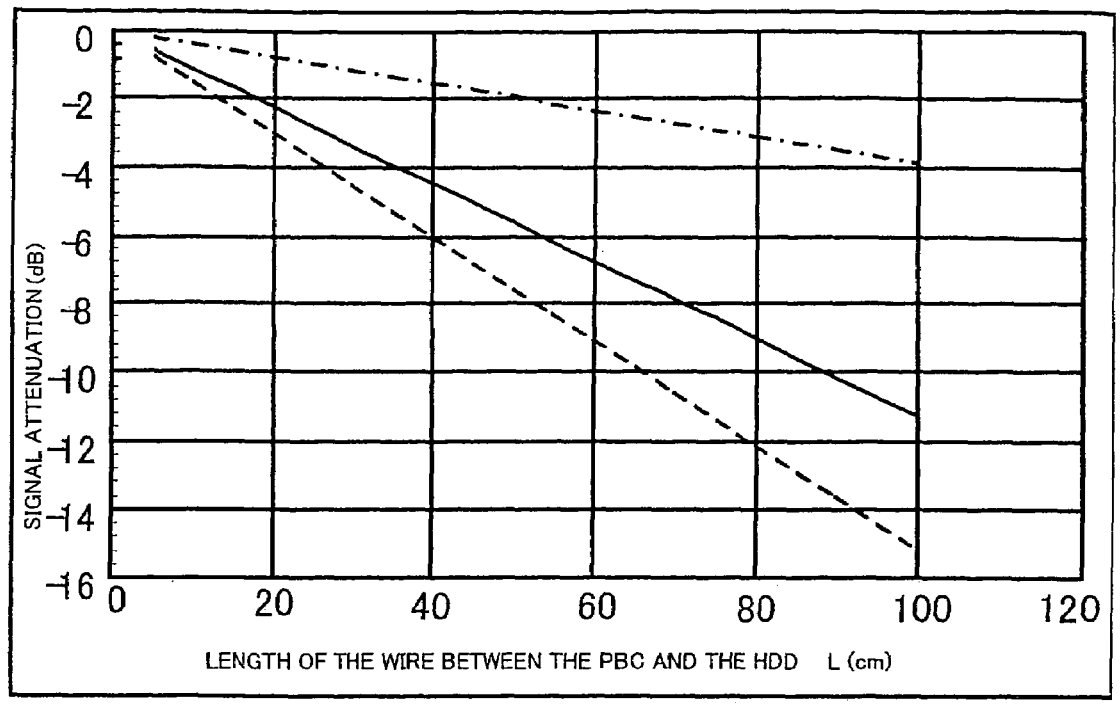
FIG. 11A shows a graph indicating the signal attenuation with respect to the length of the wire L between the PBC and HDD.
Figure 11B:
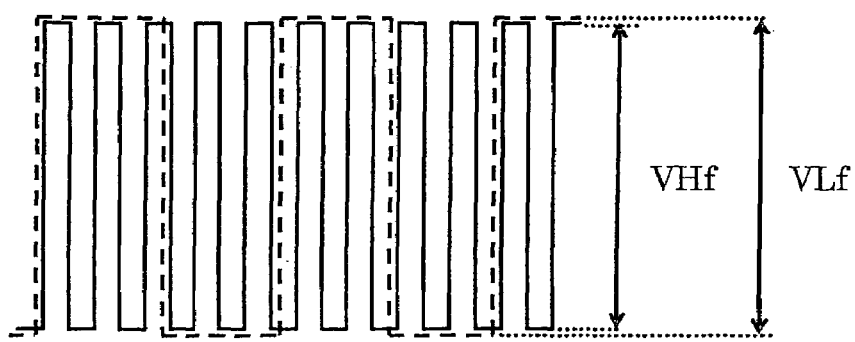
FIG. 11B shows the relationship between the amplitude VLf of the transmission signal of the longest wavelength, and the amplitude VHf of the transmission signal of the shortest wavelength.
Figure 11C:
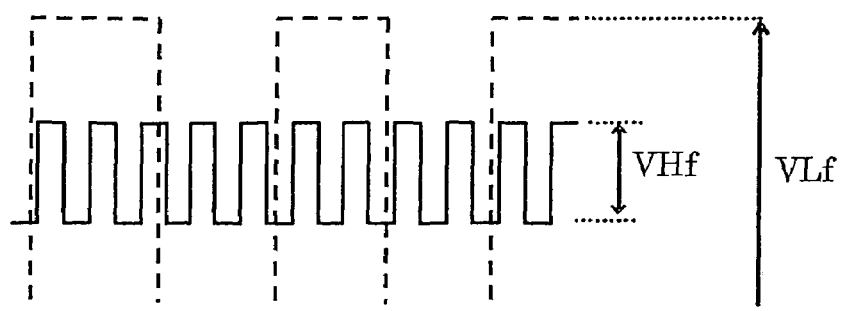
FIG. 11C shows the relationship between the amplitude VLf of the reception signal of the longest wavelength, and the amplitude VHf of the reception signal of the shortest wavelength.

FIG. 11A shows a graph indicating the signal attenuation with respect to the length of the wire L between the PBC and HDD. FIG. 11B shows the relationship between the amplitude VLf of the transmission signal of the longest wavelength, and the amplitude VHf of the transmission signal of the shortest wavelength. FIG. 11C shows the relationship between the amplitude VLf of the reception signal of the longest wavelength, and the amplitude VHf of the reception signal of the shortest wavelength. The graphs in FIG. 11 show the results of a simulation assuming that the data transfer speed is 4 Gbps. In the graph in FIG. 11A, the dot-dash line indicates the attenuation of a NRZ (Non Return to Zero) signal of the longest wavelength (for example, a data pattern of "11110000"), the dotted line indicates the attenuation of a NRZ signal of the shortest wavelength (for example, a data pattern of "10101010"), and the solid line indicates the ISI attenuation (the differential between the attenuation of the NRZ signal of the longest wavelength and the attenuation of the NRZ signal of the shortest wavelength). Furthermore, in FIG. 11B and FIG. 11C, the dotted line indicates the waveform of the NRZ signal of longest wavelength, and the solid line indicates the waveform of the NRZ signal of shortest wavelength. Moreover, in FIG. 11B and FIG. 11C, "transmission signal" means a signal transmitted by the transmission circuit 17P or 17D, and "reception signal" means a signal received by the reception circuit 18P or 18D.

According to the graph in FIG. 11A, the longer the length L of the wire between the PBC and the HDD, the greater the ISI attenuation. Furthermore, according to FIG. 11B and FIG. 11C, in a signal transmitted by the transmission signal 17P or 17D, there is virtually no difference between the signal amplitude VLf of the longest wavelength and the signal amplitude VHf of the shortest wavelength, but when a signal transmitted by the transmission circuit 17P or 17D is received by the reception circuit 18P or 18D, then the signal amplitude VHf at the shortest wavelength will be attenuated to a greater extent than the signal amplitude VLf at the longest wavelength. As can be seen from FIG. 11A, this becomes more pronounced, the greater the length L of the wire between the PBC and the HDD.

As described with respect to FIG. 6 to FIG. 11C above, the attenuation in the fiber channel signal and the ISI attenuation increase in direct proportion to at least one of the length L of the wire between the PBC and the HDD and/or the transmission frequency, and since no countermeasures are taken, the quality of the fiber channel signal declines.

Figure 12:
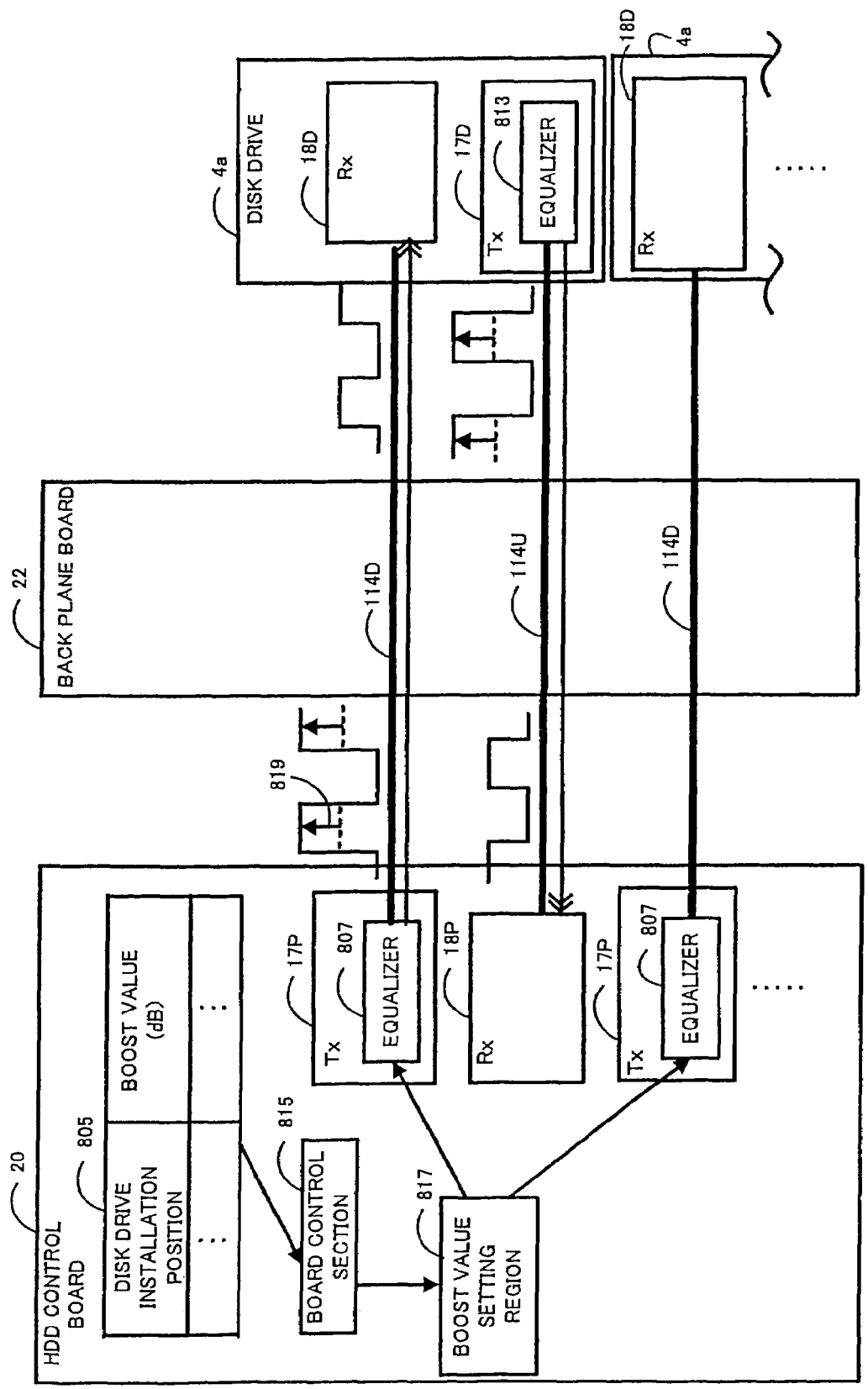
FIG. 12 shows a general view of a first embodiment of a first mode of implementing the present invention.

Therefore, as one measure for resolving this problem, in this first embodiment, an equalizer for correcting the transmission signal in accordance with the length L of the wire between the PBC and the HDD (in other words, for performing pre-emphasis) is provided on the signal transmitter side, as shown in FIG. 12.

FIG. 12 shows a general view of a first embodiment of the first mode of implementing the present invention.

The HDD control board 20 comprises a signal correction value table 805, a board control section 815 and a boost value setting region 817. An equalizer (hereinafter called "PBC side equalizer") 807 is provided in the transmission circuit 17P of the HDD control board 20, and similarly, an equalizer (hereinafter called "disk side equalizer") 813 is provided in the transmission circuit 17D of the disk drive 4a.

Signal correction values corresponding to the length L of the wire between the PBC and the HDD, for example, a plurality of boost values corresponding respectively to a plurality of disk drive installation positions, are registered in the signal correction value table 805. Here, a "boost value" is one correction parameter relating to signal correction, and all of the signals transmitted or received, or a portion of these signals (such as the high-frequency signals), are boosted by means of this correction parameter. The boost value is, for example, a value for compensating the ISI attenuation in such a manner that the amplitude of the signal of shortest wavelength upon reception is the same as the amplitude of the signal of longest wavelength upon reception.

The board control section 815 is a processor, such as a CPU, which takes the plurality of boost values recorded in the signal correction value table 805, and registers them in the boost value setting region 817. In this case, for example, the board control section 815 sets boost values corresponding to the disk drive installation positions, at predetermined addresses for each of the disk drive installation positions.

The boost value setting region 817 is a storage resource (for example, a register or memory) for recording the plurality of boost values registered in the signal correction value table 805. For example, the plurality of addresses in the boost value setting region 817 correspond respectively to the plurality of disk drive installation positions.

The PBC side equalizer 807 in each of transmission circuit 17P corrects the signal on the basis of the boost value established in the boost value setting region 817 and outputs the corrected signal. More specifically, for example, the PBC side equalizer 807 boosts the level of a prescribed region of the signal (in other words, it performs signal pre-emphasis 819), on the basis of the boost value corresponding to the installation position of the disk drive 4a to which the signal is being transmitted (in other words, the boost value recorded at the address of the boost value setting region 817 corresponding to that installation position), and it then outputs the boosted signal. In this way, a boosted signal is transmitted to the disk drive 4a, via the downstream transmission path 114D. When the output signal reaches the reception circuit 18D in the disk drive 4a, it will have been attenuated in accordance with the length of the wire between the PBC and the HDD, but since the signal level was previously boosted in accordance with this length L of the wire between the PBC and the HDD, the reception circuit 18D is able to receive a signal of a suitable level. The reception circuit 18D may also be provided with a separate equalizer (for example, an equalizer performing de-emphasis) which corrects the received signal and then outputs this corrected signal. Furthermore, the features described here can also be applied to the transmission circuit 17D of the disk drive 4a and the reception circuit 18P in the HDD control board 20. In this case, boost values are established for a disk side equalizer 813. The method for setting these boost values is described hereinafter.

The length of the plurality of transmission paths 114D, 114U (in other words, the length L of the wire between the PBC and the HDD, for the respective disk drives 4a) varies depending on how the disk drives 4a are installed in the disk array device 1. Below, various examples of methods for installing a plurality of disk drives 4a will be described.

Figure 13B:
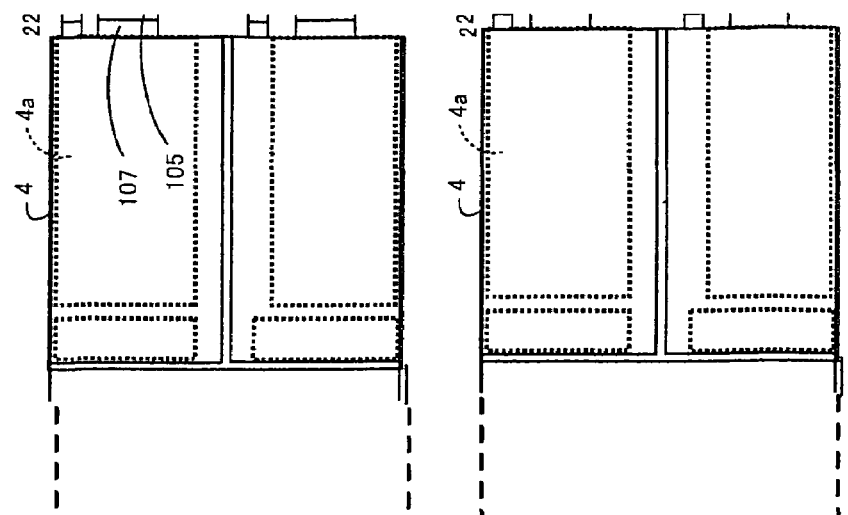
FIG. 13B shows a general view of the side face of disk drives 4a installed according to a first installation method.
Figure 13A:
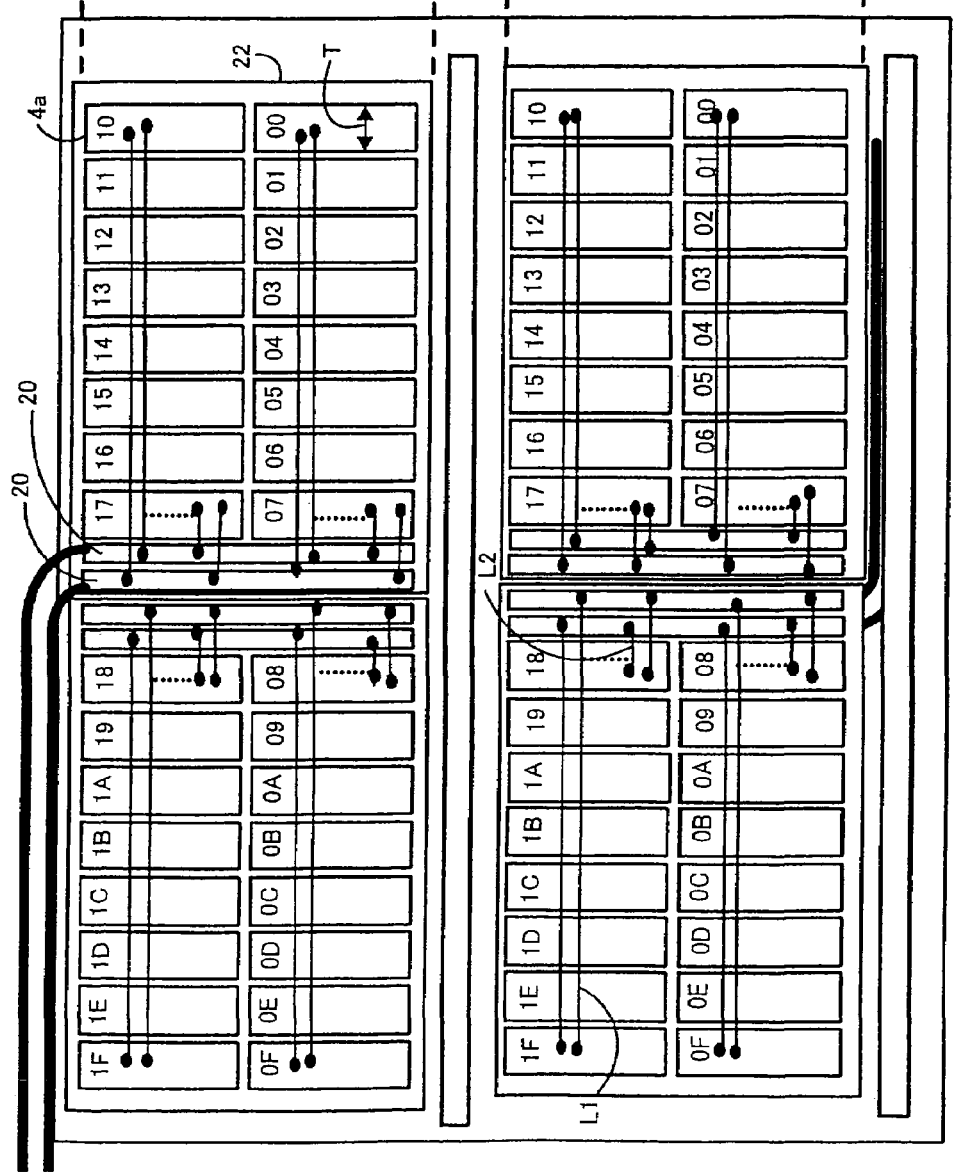
FIG. 13A shows a general view of the front side of a plurality of disk drives 4a installed in a disk array device 1 according to a first installation method.
Figures 14A, 14B:
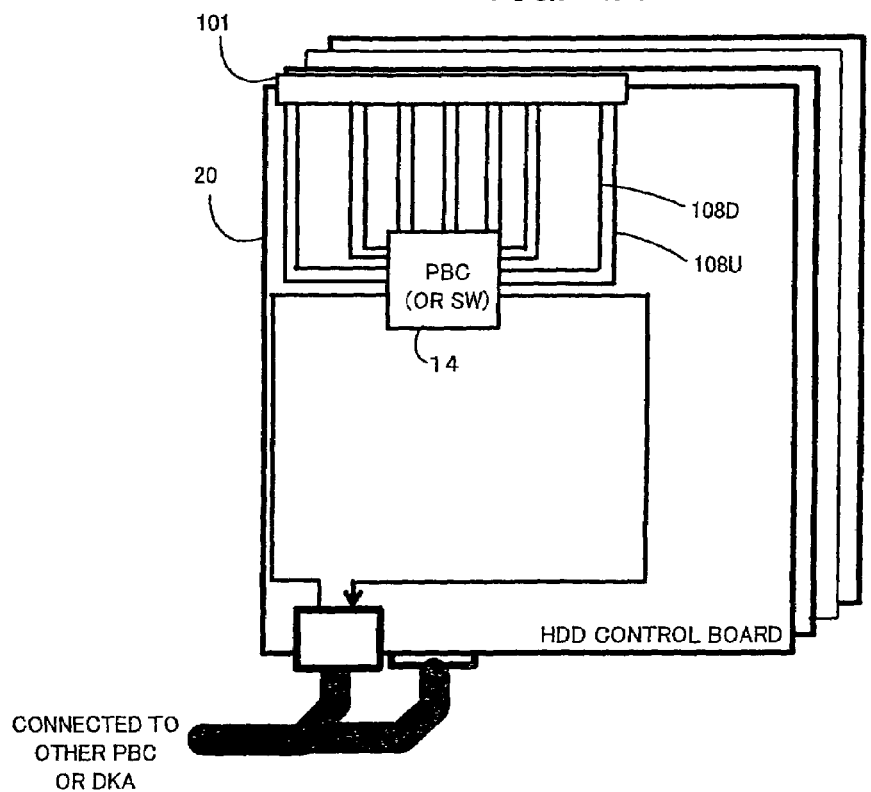
FIG. 14A shows an example of the composition of a HDD control board 20 for installing a disk drive 4a according to a first installation method.
FIG. 14B shows examples of the values of the length of the wire between the PBC and the HDD, the ISI attenuation, and the boost value, for respective installation positions of the disk drive 4a installed according to the first installation method.

FIG. 13A shows a general view of the front side of a plurality of disk drives 4a installed in a disk array device 1 according to a first installation method. FIG. 13B shows a general view of the side face of disk drives 4a installed according to a first installation method. FIG. 14A shows an example of the composition of a HDD control board 20 for installing disk drives 4a in accordance with a first installation method. In FIG. 13A, the numbers contained inside each image of a disk drive 4a indicate the ID of the installation position of that disk drive 4a.

According to this first installation method, as shown in FIG. 13A, two HDD control boards 20 are provided, and the respective disk drives 4a are connected to both of the HDD control boards 20. Therefore, even if a fault occurs in one of the HDD control boards 20, the other HDD control board 20 will still be able to exchange signals with any of the disk drives 4a.

Furthermore, according to this first installation method, as shown in FIG. 13A, the HDD control boards 20 are disposed at one end of a set of two or more (for example, eight) disk drives 4a arranged in the thickness direction T of the disk drives 4a (in other words, the start side or the end side in the longitudinal direction of a disk group formed by two or more disk drives 4a). Therefore, the transmission path between each of disk drives 4a and the PBC (or switching circuit) 14 becomes longer in the direction in which the disk drive 4a are arranged. In this case, the distance between the HDD control board 20 and each of the two or more disk drives 4a (in other words, the length of the wire between the PBC and the HDD) varies significantly depending on the position at which the disk drive 4a is installed. More specifically, for example, the difference between the longest length L1 of the wire between the PBC and the HDD (for example, the distance between the disk drive 4a at installation position ID "1F" and the rearmost HDD control board 20 of the two HDD control boards 20 connected to that disk drive 4a) and the shortest length L2 of the wire between the PBC and the HDD (for example, the distance between the disk drive 4a at installation position ID "18" and the foremost HDD control board 20 of the HDD control boards 20 connected to that disk drive 4a), is greater than in the case of the second installation method described below.

FIG. 14B shows examples of the values of the length L of the wire between the PBC and the HDD, the ISI attenuation, and the boost value, for respective installation positions of the disk drive 4a installed according to the first installation method. These examples relate to a case where the FC transfer speed is 4.25 Gbps. According to FIG. 14B, it can be seen that the variation in the plurality of ISI attenuation values corresponding respectively to a plurality of disk drive installation positions, (in other words, the plurality of boost values corresponding respectively to the plurality of disk drive installation positions) is greater than in the case of the second installation method described below.

Figures 16A, 16B:
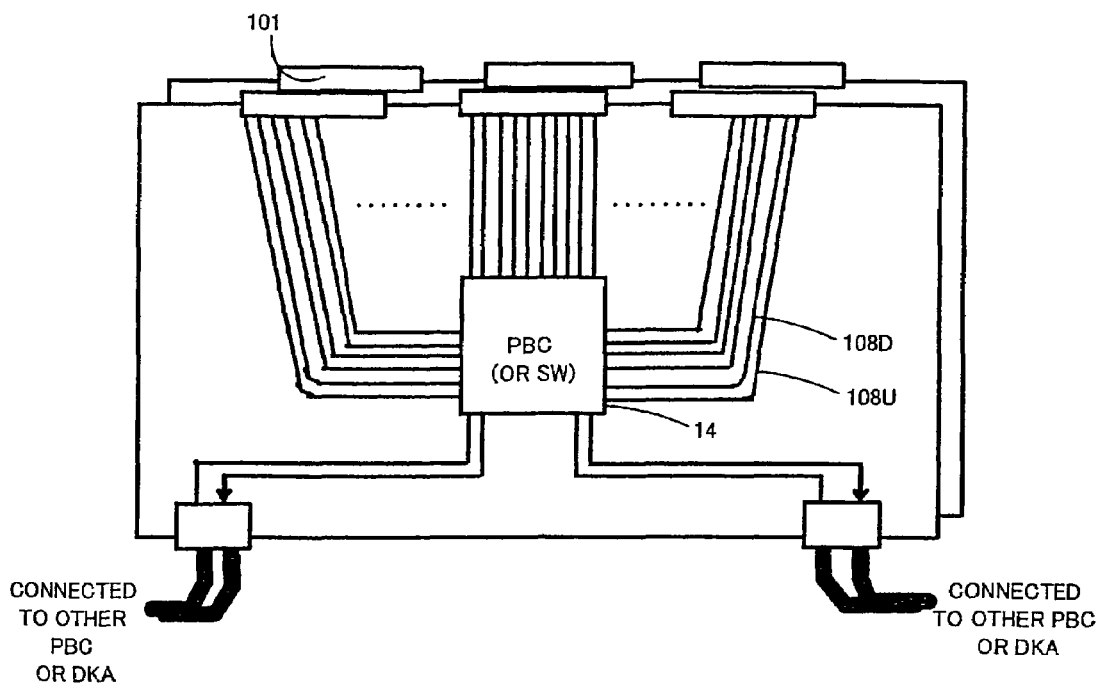
FIG. 16A shows an example of the composition of a HDD control board 20 for installing a disk drive 4a according to a second installation method.
FIG. 16B shows examples of the values of the length of the wire between the PBC and the HDD, the ISI attenuation, and the boost value, for respective installation positions of the disk drive 4a installed according to the second installation method.

FIG. 15A shows a general view of the front side of a plurality of disk drives 4a installed in a disk array device 1 according to a second installation method. FIG. 15B shows a general view of the side face of disk drives 4a installed according to a second installation method. FIG. 16A shows an example of the composition of a HDD control board 20 for installing disk drives 4a in accordance with a second installation method. In FIG. 15A, the numbers contained inside each image of a disk drive 4a indicate the ID of the installation position of that disk drive 4a as in FIG. 13A.

In the second installation method, similarly to the first installation method, two HDD control boards 20 are provided.

According to the second installation method, a disk drive group is constituted by a plurality of disk drives 4a (for example, 16 disk drives 4a) disposed in a horizontal direction, and the HDD control boards 20 are mounted in such a manner that their faces are orientated towards the side of the disk drive group, in the longitudinal direction thereof. Therefore, the transmission path between each of disk drives 4a and the PBC (or switching circuit) 14 becomes longer in a transverse direction to the direction in which the disk drives 4a are arranged (for example, the orthogonal direction). In this case, the distance between the HDD control board 20 and each of the two or more disk drives 4a connected to same (in other words, the length of the wire between the PBC and the HDD) does not vary significantly with the position at which the disk drive 4a is installed. More specifically, for example, the difference between the longest length L1 of the wire between the PBC and the HDD (for example, the distance between the disk drive 4a at installation position ID "1F" and the rearmost HDD control board 20 of the two HDD control boards 20 connected to that disk drive 4a) and the shortest length L2 of the wire between the PBC and the HDD (for example, the distance between the disk drive 4a at installation position ID "18" and the foremost HDD control board 20 of the HDD control boards 20 connected to that disk drive 4a), is less than in the case of the first installation method described above.

FIG. 16B shows examples of the values of the length L of the wire between the PBC and the HDD, the ISI attenuation, and the boost value, for respective installation positions of the disk drive 4a installed according to the second installation method. These examples relate to a case where the FC transfer speed is 4.25 Gbps. According to FIG. 16B, it can be seen that the variation in the plurality of ISI attenuation values corresponding respectively to a plurality of disk drive installation positions, (in other words, the plurality of boost values corresponding respectively to the plurality of disk drive installation positions) is less than in the case of the first installation method described above.

Above a first and a second installation method were described, but the method for installing a plurality of disk drives 4a is not limited to these examples. For example, if the second installation method is adopted, then it may be possible to reduce the number of boost values registered in the signal correction value table 805 (see FIG. 12), compared to a case where the first installation method is adopted. This is because in the case of the second installation method, even at different disk drive installation positions, the length of the wire between the PBC and the HDD is substantially the same, and in cases of this kind, it is possible to associate one boost value with a plurality of disk drive installation positions.

In the disk array device 1, there may be differences between the respective lengths of the wires between the PBC and the plurality of disk drives 4a. As stated previously, pre-emphasis can be performed by the PBC side equalizer 807 (see FIG. 12) and the disk side equalizer 813, in accordance with the length of the wire, and several pre-emphasis methods can be envisaged. Below, a number of pre-emphasis methods are described.

Figure 17A:
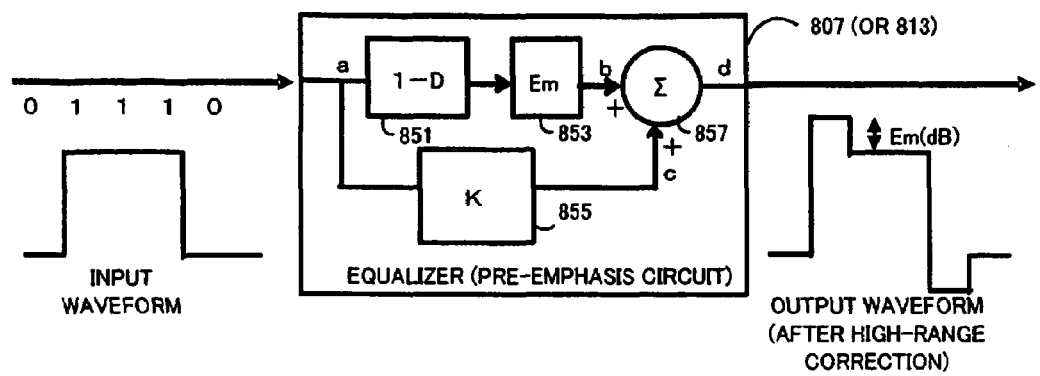
FIG. 17A shows a block diagram according to a first pre-emphasis method.
Figure 17B:
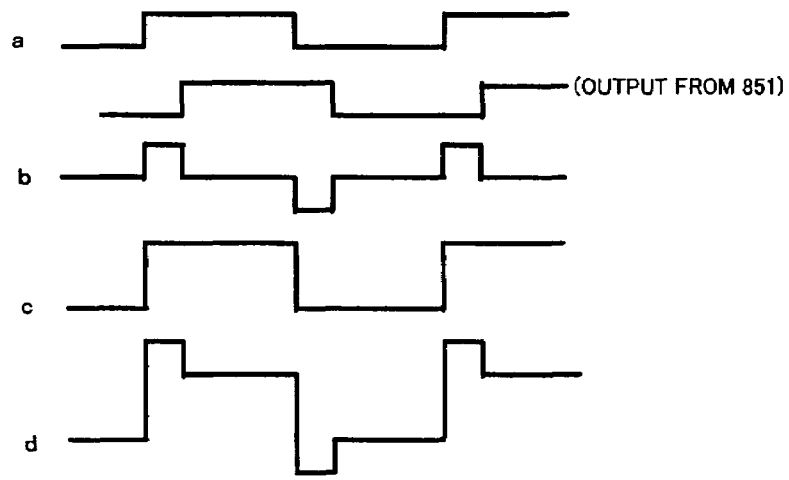
FIG. 17B shows the waveforms of the respective signals a-d in FIG. 17A.
Figure 17C:
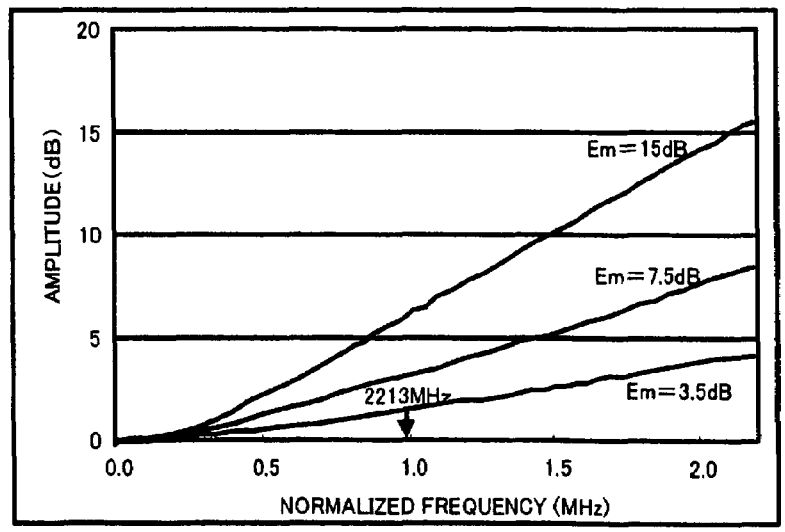
FIG. 17C shows graphs of amplitude against frequency, when the first pre-emphasis method is implemented.

FIG. 17A shows a block diagram according to a first pre-emphasis method. FIG. 17B shows the waveforms of the respective signals a-d in FIG. 17A. FIG. 17C shows graphs of amplitude against frequency, when the first pre-emphasis method is implemented.

As shown in FIG. 17A, the PBC side equalizer 807 (or the disk side equalizer 813) according to the first pre-emphasis method is a so-called L-type equalizer, and it comprises a subtracting circuit 851, a first multiplying circuit 853, a second multiplying circuit 855, and an adding circuit 857.

The subtracting circuit 851 performs a 1-D subtraction on the input signal a (in other words, a subtraction operation of signal a and the delay circuit D), and it outputs the signal thus obtained. Here, D is a delay calculation element (in other words a 1-bit delay circuit) given by the equation:

$$D = e^{-jw\frac{Tb}{2}} \qquad (1)$$

The first multiplying circuit 853 multiplies the signal output by the subtracting circuit 851 by a high-range correction coefficient Em for adjusting the amount of pre-emphasis, and it outputs this multiplied signal b.

The second multiplying circuit 855 multiplies the input signal, a, by a signal amplitude coefficient K, and outputs the signal c obtained by this multiplication of signal a.

The adding circuit 857 calculates the sum of the signal b output by the first multiplying circuit 853 and the signal c output by the second multiplying circuit 855, and it outputs this sum as signal d.

By means of this processing, the PBC side equalizer 807 is able to convert the input signal a into a signal d having a waveform wherein a pulse width having a period of 1 bit is added at each change point of the input signal. In other words, as can be seen from FIG. 17B, the waveform of signal d has additional 1-bit pulses at each change point in the signal, in comparison to the input signal a. By adjusting the value of the signal amplitude coefficient K, it is possible to adjust the transmission amplitude value, and by adjusting the value of the correction coefficient Em, it is possible to adjust the high-range boost value.

For example, taking T in equation (1) above as T=1/f=2 n/w, the transmission amplification coefficient K, as 2, and the high-range correction coefficient Em as 1, then the transfer function of the equalizer 807 (or 813) will be given by equation (2) below, $$G(w) = 3 - e^{-j\frac{\pi}{2}*\frac{w}{w0}} \quad (2)$$

From this, as shown in FIG. 17C, as the value of the correction coefficient Em increases (for example, from 3.5 dB, to 7.5 dB, to 15 dB), the amplitude of the output signal d also increases. In other words, the boost value registered in the aforementioned signal correction value table 805 (see FIG. 12) is the high-range correction coefficient Em, for example. The transmission amplification coefficient K may be a fixed value, or it may be registered in the signal correction value table 805 with respect to each disk drive installation position.

Figure 18A:
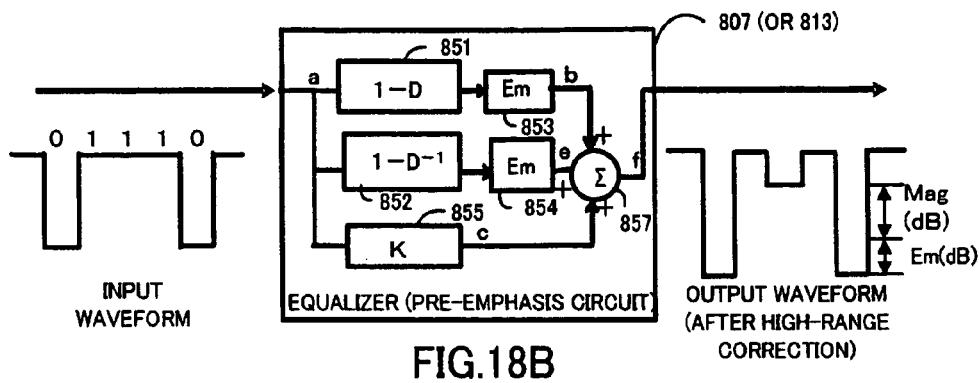
FIG. 18A shows a block diagram according to a second pre-emphasis method.
Figure 18B:
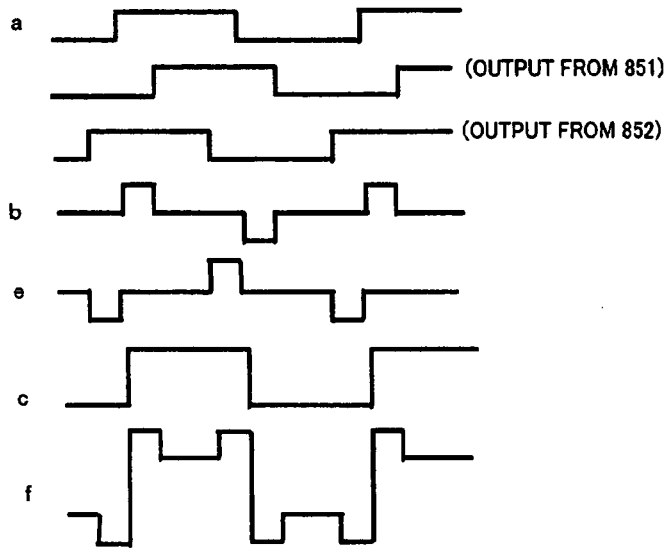
FIG. 18B shows the waveforms of the respective signals a, b, c, d, e, f in FIG. 18A.
Figure 18C:
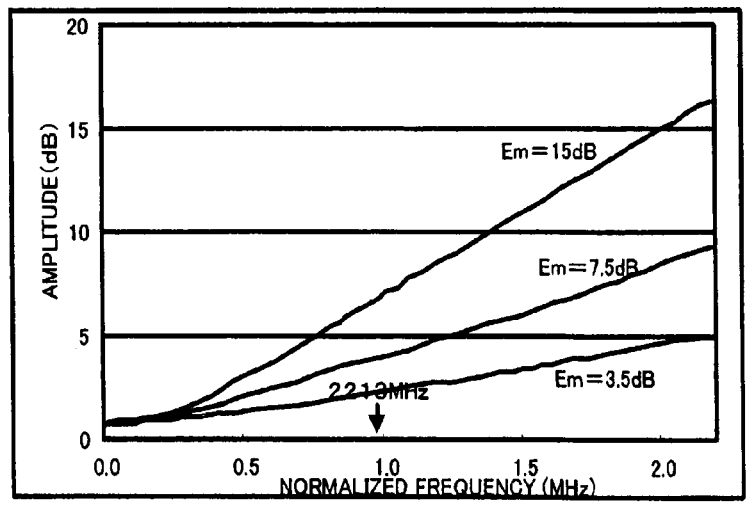
FIG. 18C shows graphs of amplitude against frequency, when the second pre-emphasis method is implemented.

FIG. 18A shows a block diagram according to a second pre-emphasis method. FIG. 18B shows the waveforms of the respective signals a, b, c, d, e, f in FIG. 18A. FIG. 18C shows graphs of amplitude against frequency, when the second pre-emphasis method is implemented. Elements which are the same as those in FIG. 17A to FIG. 17C are labelled with the same reference numerals.

As shown in FIG. 18A, the PBC side equalizer 807 (or the disk side equalizer 813) according to the second pre-emphasis method is a so-called E-type equalizer, and it comprises a first subtracting circuit 851, a second subtracting circuit 852, a first multiplying circuit 853, a third multiplying circuit 854, a second multiplying circuit 855, and an adding circuit 857.

Similarly to the first pre-emphasis method, the first subtracting circuit 851 performs a 1-D subtraction with respect to the input signal a, and outputs the signal obtained by this subtraction operation.

The second subtracting circuit 852 performs a 1-D$^{-1}$ subtraction with respect to the input signal a, and it outputs the signal obtained by this subtraction.

The first multiplying circuit 853 multiplies the signal output by the first subtracting circuit 851 by a high-range correction coefficient Em for adjusting the amount of pre-emphasis, and it outputs this multiplied signal b.

The third multiplying circuit 854 multiplies the signal output by the second subtracting circuit 852 by the high-range correction coefficient Em for adjusting the amount of pre-emphasis, and it outputs this multiplied signal e.

The second multiplying circuit 855 multiplies the input signal a by a signal amplitude coefficient K and outputs the signal c obtained by this multiplication of signal a.

The adding circuit 857 calculates the sum of the signal b output by the first multiplying circuit 853, the signal e output by the third multiplying circuit 854, and the signal c output by the second multiplying circuit 855, and it outputs this sum as signal f.

In other words, the PBC side equalizer 807 (or the disk side equalizer 813) according to the second pre-emphasis method performs a subtraction operation (1-D) of the data signal having passed through a 1-bit delay circuit D, and the input signal a, multiplies the signal obtained by this operation by a high-range correction coefficient Em, and then outputs the resulting signal b. Furthermore, the PBC side equalizer 807 (or disk side equalizer 813) performs a subtraction (1-D$^{-1}$) of the signal prior to the 1-bit delay circuit and the input signal a, multiplies the signal obtained from this operation by a high-range correction coefficient Em, and then outputs the resulting signal e. Furthermore, the PBC side equalizer 807 (or disk side equalizer 813) outputs a signal c obtained by multiplying the input signal a by a signal amplification coefficient K. The PBC side equalizer 807 (or disk side equalizer 813) then adds the three output signal b, e, c, together in the adding circuit 857, thereby obtaining an output waveform f wherein pulse widths having a 1-bit period are added before and after the change points in the input signal a.

Taking the transmission amplification coefficient K to be 2 and the high-range correction coefficient Em to be 1, the transfer function of this equalizer 807 (or 813) can be expressed by the following equation (3), $$G(w) = 2\left(2 - \cos\frac{\pi}{2}\frac{w}{wo}\right) \quad (3)$$

Thereby, as shown in FIG. 18C, the high frequency region is emphasized more strongly than in the case of the first pre-emphasis method.

Figure 19A:
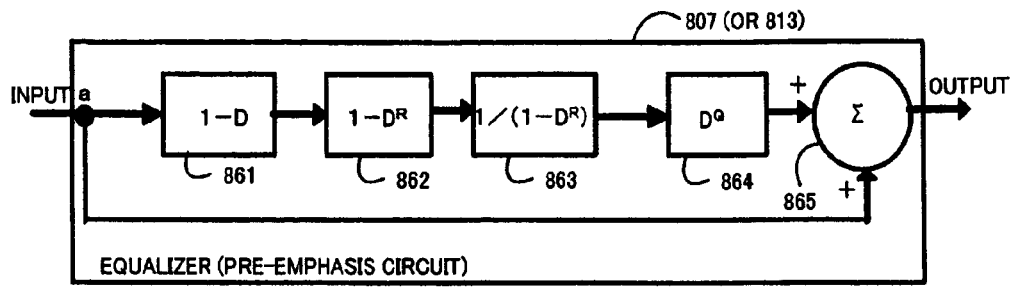
FIG. 19A shows a block diagram according to a third pre-emphasis method.
Figure 19B:
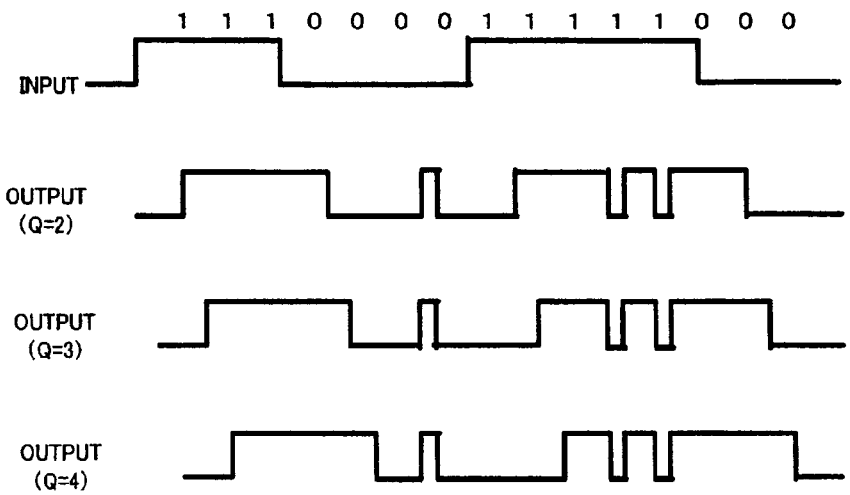
FIG. 19B shows an input signal waveform and output signal waveforms in FIG. 19A.
Figure 19C:
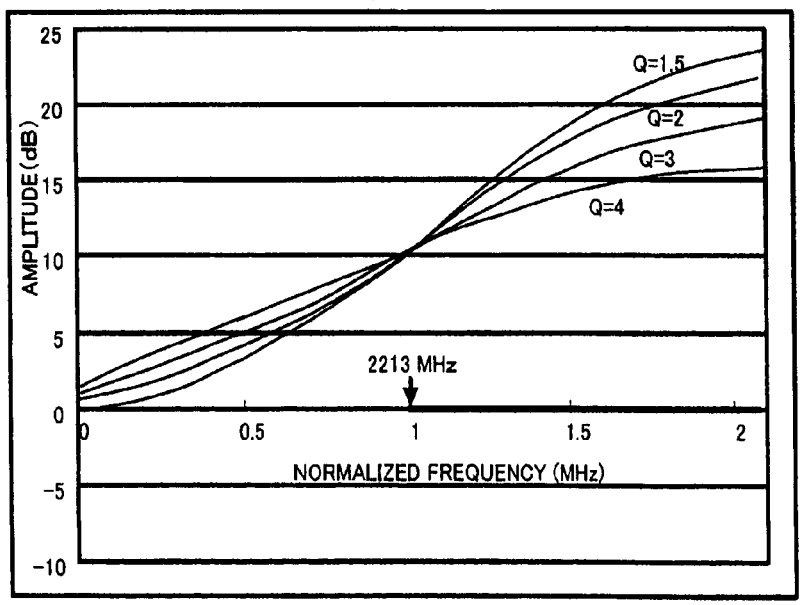
FIG. 19C shows graphs of amplitude against frequency, when a third pre-emphasis method is implemented.

FIG. 19A shows a block diagram according to a third pre-emphasis method. FIG. 19B shows an input signal waveform and output signal waveforms relating to FIG. 19A. FIG. 19C shows graphs of amplitude against frequency, when the third pre-emphasis method is implemented.

As shown in FIG. 19A, the PBC side equalizer 807 (or disk side equalizer 813) according to the third pre-emphasis method is a so-called "extra-plus" type equalizer. This equalizer 807 comprises, for example, a circuit 861 for performing a 1-D operation on the input signal a and outputting the resulting signal, a circuit 862 for inputting the signal output by the circuit 861, performing a 1-D$^R$ operation on same and outputting the resulting signal, a circuit 863 for inputting the signal output by the circuit 862, performing a 1/(1-D$^R$) operation on same (where R=2, for example), and outputting the resulting signal, a circuit 864 for inputting the signal output by circuit 863, multiplying it by D$^Q$, and outputting the resulting signal, and an adding circuit 865 for adding the signal output by the circuit 864 to the input signal a, and outputting the resulting signal.

The transfer function of the equalizer 807 (or 813) can be expressed by the following equation (4), $$G(D) = 1 - \frac{(1-D)(1+D^2)D}{1-D^2} \quad (4)$$

which, if simplified, can be expressed by the following equation (5), $$G1(D) = \frac{D - D^3}{1 + D} \quad (5)$$

which can be further simplified to the expression in the following equation (6)

$$GI(D) = \frac{1-D^3}{1+D} \quad (6)$$

Here, if D is taken to be the expression in equation (1) above, then the transfer function of the equalizer 807 (or 813) can be expressed by the following equation (7)

$$GI(x) = \frac{j\sin\frac{3\pi\chi}{2}}{\cos\frac{\pi\chi}{2}} \cdot e^{-j\chi} \quad (7)$$

According to this third pre-emphasis method, the equalizer 807 (or 813) is provided with a linear digital filter, whereby pulses of ½ bit or less can be embedded in the "0" data in the transmission signal. Furthermore, by adjusting the coefficient Q, it is possible to adjust the waveform of the transmission signal.

The foregoing descriptions related to several examples of pre-emphasis methods which can be adopted in the equalizer 807 (or 813), but the pre-emphasis method is not limited to these examples.

In the first embodiment, a signal correction value table 805 can be constructed in the HDD control board 20, as described below, for instance.

Figure 20A:
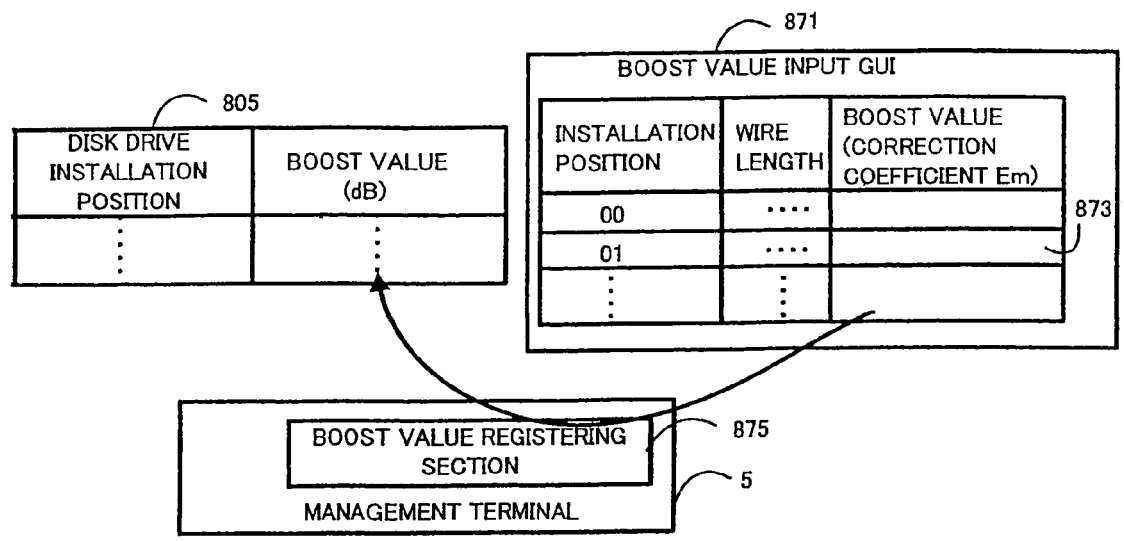
FIG. 20A shows a first example of a method for constructing a signal correction value table 805.

FIG. 20A shows a first example of a method for constructing a signal correction value table 805.

The management terminal 5 is one example of a computer capable of registering information in the storage region where the signal correction value table 805 is registered. The management terminal 5 displays a boost input value GUI (graphical user interface) 871 for inputting a boost value (dB) for each disk drive installation position. The length L of the wire between the PBC and the HDD for each disk drive installation position is displayed on the GUI 871, so the user can tell what level of boost value to enter for each installation position. The user enters boost values for the respective disk drive installation positions, by means of the boost value input GUI 871.

The management terminal 5 also comprises a boost value registering section 875. The boost value registering section 875 is, for example, a computer program stored in a memory, which is executed by being loaded into a CPU (not illustrated) inside the management terminal 5. When a boost value is input for a disk drive installation position, the boost value registering section 875 registers the input boost value in the signal correction value table 805.

According to the first example of a construction method described above, the respective boost values registered in the signal correction value table 805 are values determined freely by the user.

Figure 20B:
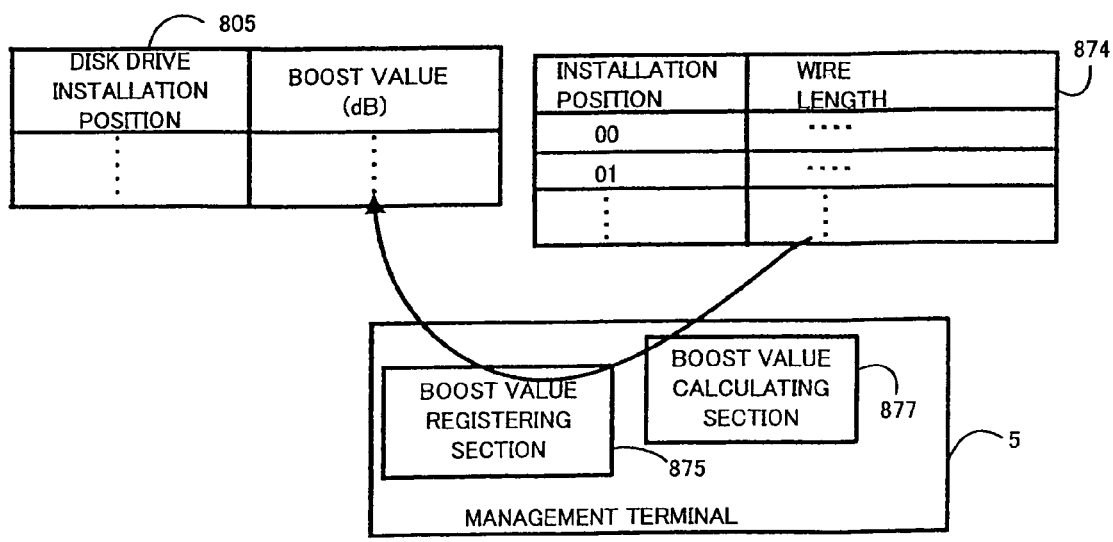
FIG. 20B shows a second example of a method for constructing a signal correction value table 805.

FIG. 20B shows a second example of a method for constructing a signal correction value table 805.

The management terminal 5 comprises a boost value calculating section 877 in addition to the boost value registering section 875. The boost value calculating section 877 is, for example, a computer program stored in a memory, which is executed by being loaded into a CPU (not illustrated) inside the management terminal 5. The boost value calculating section 877 refers to wiring length information 874 indicating the length L of the wire between the PBC and the HDD for each installation position, and it extracts respective wire lengths and calculates boost values corresponding to the respective wire lengths thus extracted. The boost value registering section 875 then registers the respective boost values thus calculated in the signal correction value table 805.

According to the second example of a construction method described above, the respective boost values registered in the signal correction value table 805 are values calculated by a computer.

Here, methods have been described where boost values are established in the equalizer 807 provided in the PBC (or switching circuit 14), but boost values corresponding to the length L of the wire between the PBC and the HDD may also be established in the disk side equalizer 813. Various methods for setting these boost values can be envisaged. For example, a computer machine (for example, a management terminal 5) may be connected to a disk drive 4a installed in the disk array device 1 (for example, a disk drive 4a connected to the back plane board 22), and boost values for the respective disk drives 4a may be input automatically or manually, by means of this computer machine, using either the first or second construction method described above. Furthermore, other methods such as those described below may also be envisaged.

Figure 21:
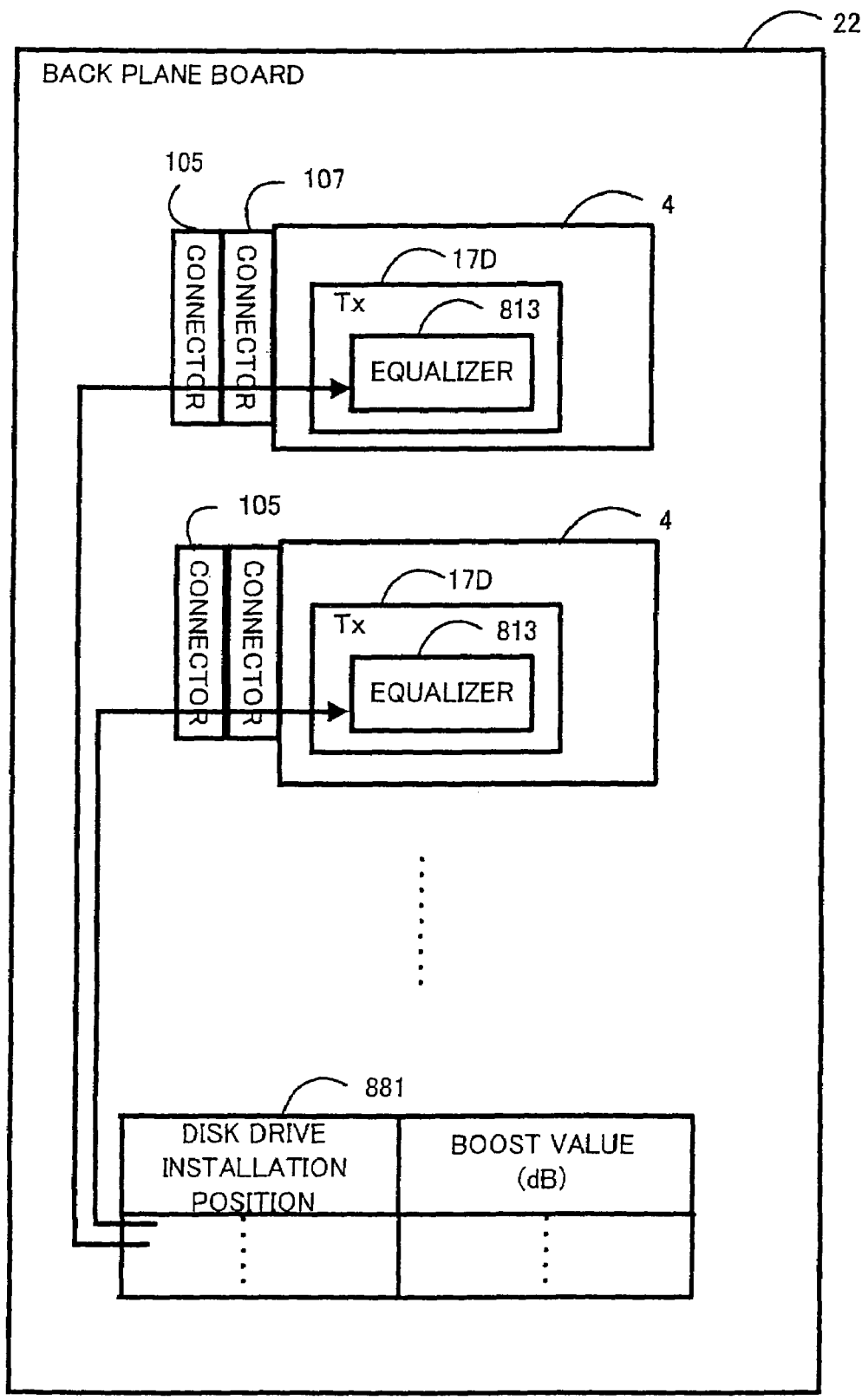
FIG. 21 shows one example of a method for setting boost values in a disk side equalizer 813.

FIG. 21 shows one example of a method for setting boost values in a disk side equalizer 813.

A signal correction value table 881 containing boost values corresponding to respective disk drive installation positions is registered in the back plane board 22. The signal correction value table 881 is created in a memory, for example, and has a plurality of addresses. At each of the plurality of addresses, a boost value is stored which corresponds to the disk drive installation position (in other words, the second connector 105) associated with that address. In this case, for example, if it is detected that a disk drive 4a has been connected to a particular second connector 105, then the boost value located at the address corresponding to that second connector 105 (in other words, the boost value registered in the signal correction value table 881 which has been associated with the disk drive installation position corresponding to that second connector 105) is read out and established in the disk side equalizer 813 belonging to the connected disk drive 4a.

Figure 22:
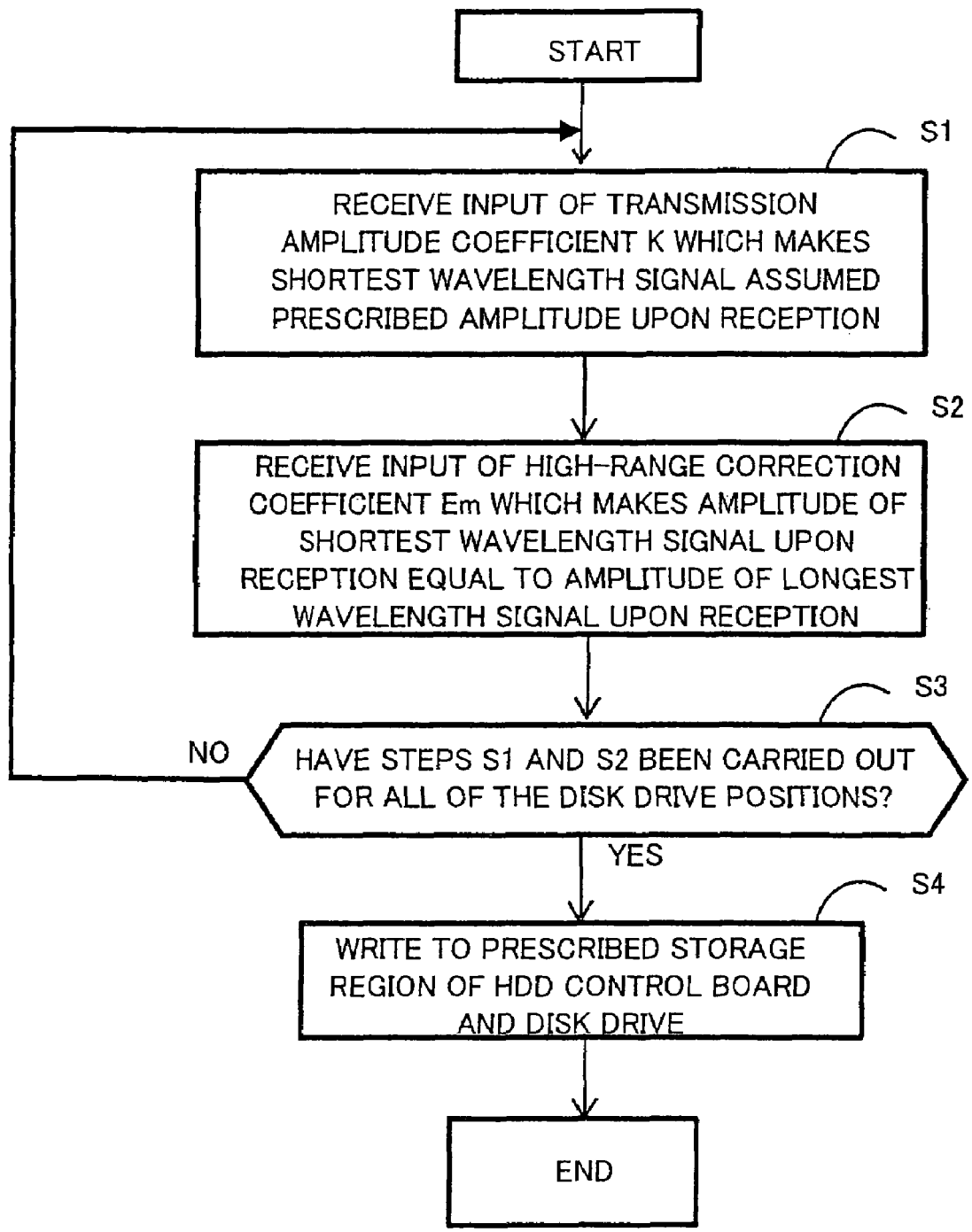
FIG. 22 shows an example of a sequence for setting boost values for respective transmission circuits 17P and 17D, in the first embodiment.

FIG. 22 shows an example of a sequence for setting boost values for respective transmission circuits 17P, 17D, in the first embodiment. This sequence is an example of a case where the equalizer 807 (or 813) performs pre-emphasis according to the first or second pre-emphasis methods.

For example, the management terminal 5 selects a particular disk drive installation position in accordance with operations performed by the user, and it then carries out the following processing with respect to the transmission circuits 17P, 17D corresponding to that disk drive installation position. In other words, the management terminal 5 receives the input of a transmission amplification coefficient K which causes the amplitude of the longest wavelength signal upon reception to assume a prescribed value, and it stores the input transmission amplification coefficient K in association with the selected disk drive installation position (step S1). Furthermore, the management terminal 5 receives the input of a high-range correction coefficient Em which causes the amplitude of the shortest wavelength signal upon reception to assume the same value as the amplitude of the longest wavelength upon reception, and it stores the input high-range correction coefficient Em in association with the selected disk drive installation position (step S2).

The management terminal 5 carries out the processing in S1 and S2, with respect to all of the disk drive installation positions (in other words, all of the transmission circuits 17P, 17D) (YES at S3), and when this has been completed, it sends the plurality of disk drive positions, the transmission amplification coefficient K values and the high-range correction coefficient Em values stored thus far, to a prescribed storage region of the HDD control board 20 or the disk drives 4a (S4). For example, the management terminal 5 establishes a value for the transmission amplification coefficient K in the equalizers 807, 813 of the respective transmission circuits 17P and 17D, and it registers a high-range correction coefficient Em (boost value) in the signal correction value table 805 of the HDD control board 20. The value of the transmission amplification coefficient K may also be registered in the signal correction value table 805, and set in the respective equalizers 807 via the boost value setting region 817 (which is a register, for example).

The foregoing description related to a first embodiment. In this first embodiment, equalizers for increasing the signal amplitude were installed in the transmission circuits 17P and 17D, but equalizers of this kind may also be installed in the reception circuits 18P or 18D, or they may be installed between the transmission circuits 17P (or 17D) and the reception circuits 18D (or 18P) (for example, on the back plane board 22).

Figure 23A:
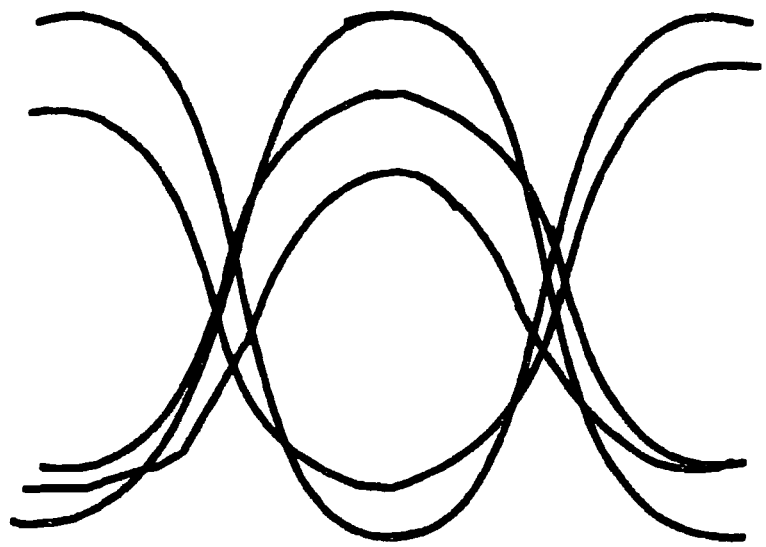
FIG. 23A shows an eye pattern indicating transmission characteristics in a case where the measures according to the first embodiment are not implemented.
Figure 23B:
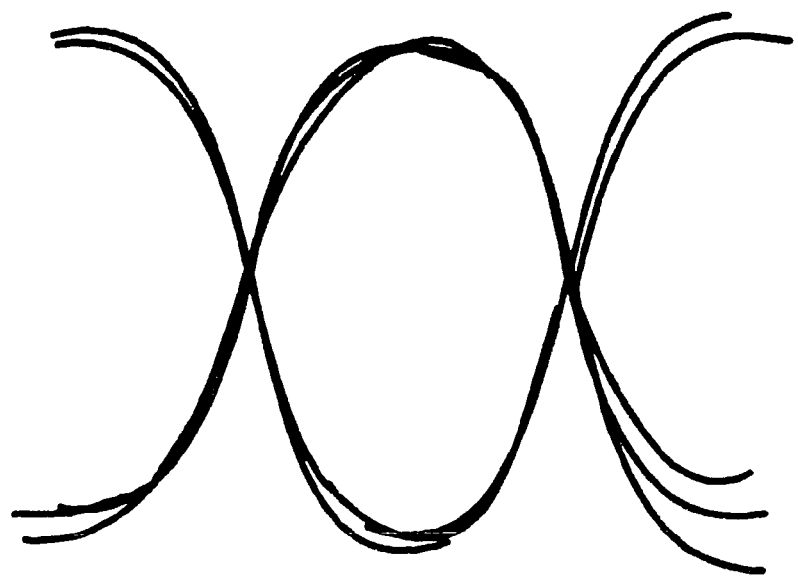
FIG. 23B shows an eye pattern indicating transmission characteristics in a case where the measures according to the first embodiment are implemented.

According to this first embodiment, each boost value is set on the basis of the ISI attenuation corresponding to the length of the transmission path 114U (or 114D) between the transmission circuit 17D (or reception circuit 18P) of the disk drive 4a, and the reception circuit 18P (or transmission circuit 17P) of the HDD control board 20, and the high frequency component of the signal is boosted on the basis of this boost value. Thereby, it is possible to prevent degradation in the quality of the signal during transmission, regardless of the wiring length L. More specifically, for example, if data is transmitted between the HDD control board 20 and a disk drive 4a without implementing measures such as those described in the first embodiment, then as shown in FIG. 23A, for example, the cross point of the eye pattern indicating the signal transmission characteristics will diverge significantly, causing the eye opening to become narrower, whereas if measures such as those described in the first embodiment are implemented, then as shown in FIG. 23B, for example, there is little divergence in the cross point of the eye pattern and the eye opening is large.

Embodiment 2

Next, a second embodiment of the first mode of implementing the present invention will be described. The following description will focus on differences with respect to the first embodiment, and points which are common with the first embodiment are either omitted or are explained briefly.

Figure 24:
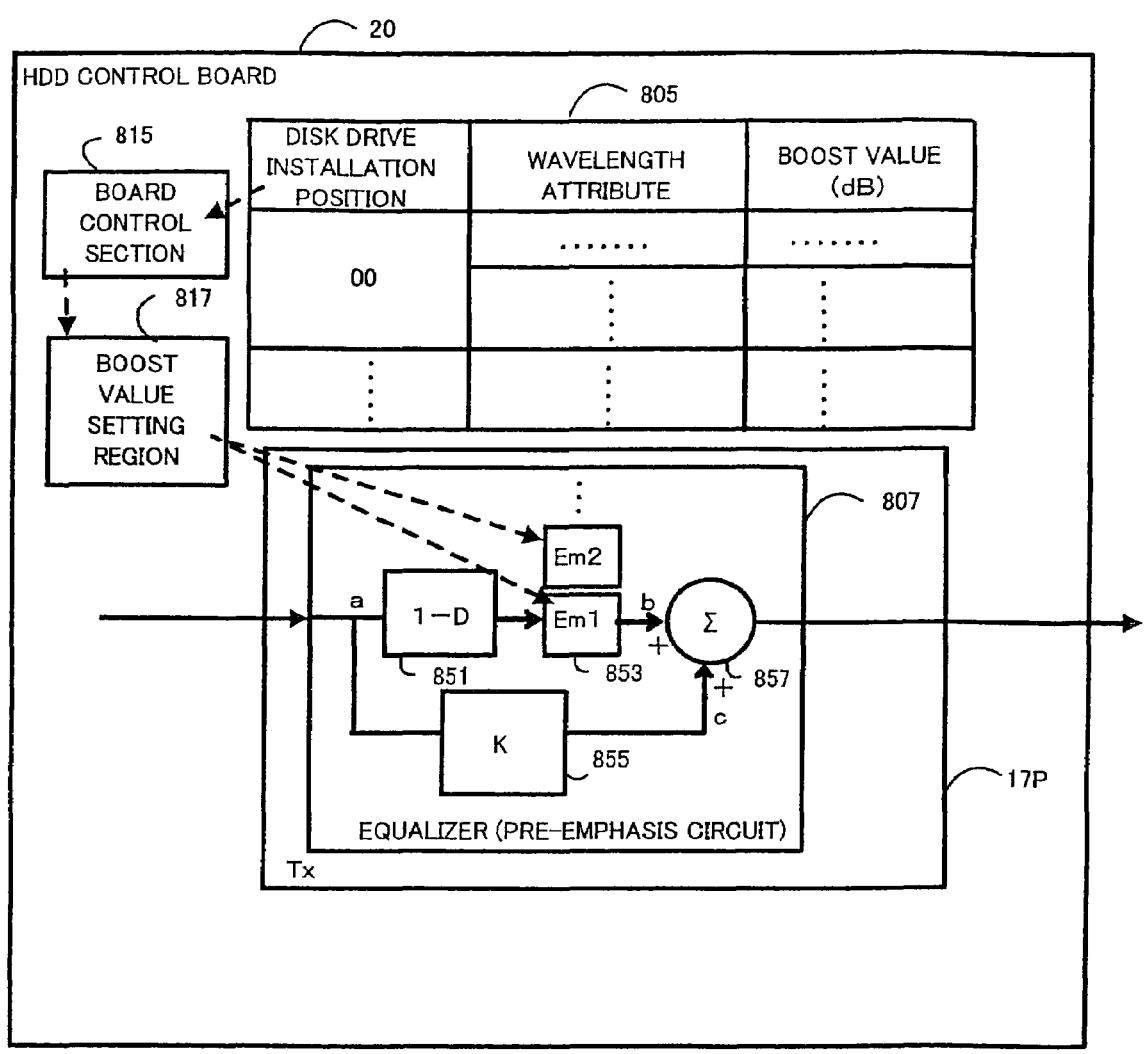
FIG. 24 shows an example of the composition of an HDD control board 20 according to the second embodiment of the present invention.

FIG. 24 shows an example of the composition of an HDD control board 20 according to the second embodiment of the present invention.

In the signal correction value table 805, a plurality of wavelength attributes are registered for respective disk drive installation positions, and boost values are registered for each of the wavelength attributes. Here, "wavelength attribute" means information relating to the wavelength of the transmitted data, for example, the data pattern.

The board control section 815 reads out information from the signal correction value table 805 and registers it in the boost value setting region 817, and the information registered in the boost value setting region 817 is read in to each of the equalizers 807. A plurality of boost values, such as high-range correction coefficient values Em, are set in each of the equalizers 807. The equalizer 807 illustrated in FIG. 24 is one example of a so-called L-type correction circuit.

When the subtracting circuit 851 outputs a signal, one of the plurality of high-range correction coefficient values Em is selected on the basis of the wavelength attribute of that signal (for example, on the basis of the data pattern of the signal), and the circuit of the plurality of multiplying circuits 853 which uses the selected high-range correction coefficient Em to perform multiplication is chosen as the destination for the signal.

According to this second embodiment described above, a boost value is set on the basis of the ISI attenuation which corresponds to the wavelength attribute (for example, the data pattern), and the high-frequency component of the signal is boosted on the basis of that boost value. Thereby, it is possible to prevent degradation in the quality of the signal during transmission, regardless of the wavelength attribute.

The composition described above may be applied to equalizers 807 (or 813) according to the second or third pre-emphasis methods. Moreover, an equalizer 807 (or 813) according to this second embodiment is not limited to being provided in the transmission circuits 17P and 17D, and it may also be provided in the reception circuits 18P or 18D, or in the back plane board 22. Furthermore, in addition to boost values, it is also possible to prepare values of the transmission amplification coefficient K for each wavelength attribute.

Third Embodiment

FIG. 25A shows an example of the composition of a canister relating to a third embodiment of the first mode of implementing the present invention. FIG. 25B is a block diagram of the canister 4 shown in FIG. 25A.

The canister is provided with a DC/DC connector 887, and a circuit board 891 comprising a DC/DC converter 893.

The DC/DC connector 887 is connected to the DC/DC converter 893, and it also connects to a DC/DC connector 888 provided on the back plane board 22. If the DC/DC connector 887 is connected to the DC/DC connector 888 of the back plane board 22 (in other words, if it is powered up), then a disk identification signal, described hereinafter (for example, a signal wherein only one prescribed bit of an 8-bit signal is set to high level) is output to the circuit board 891.

The DC/DC converter 893 converts the DC voltage supplied via the DC/DC connector 887 (for example, 48V), into a DC voltage corresponding to the disk drive 4a (for example, 5V or 12V), and it supplies this converted voltage to the disk drive 4a.

An LED 889 displaying the state of the disk drive 4a, and a boost value output section 899, for example, are provided in the circuit board 891. The boost value output section 899 comprises a signal correction value table 897. The signal correction value table 897 registers a plurality of boost values corresponding respectively to a plurality of disk identification signals.

FIG. 25C shows an example of the composition of the signal correction value table 897.

In the signal correction value table 897, a disk attribute and a boost value are associated with each one of a plurality of bit numbers. The disk attribute is an attribute relating to the disk drive 4a, and for example, it is at least one of: the type of disk drive 4a (for example, FC, SATA or SAS), the transfer speed of the disk drive 4a, and the provider of the disk drive 4 (for example, the maker or vendor).

In this third embodiment, the composition of the DC/DC connector 887 installed in the canister 4 (and/or the DC/DC connector 888 of the back plane board 22) varies, depending on the attribute of the disk drive 4a. For example, if there are eight types of disk attributes for the disk drive 4a, as illustrated in the example in FIG. 25C, then there are also eight types of composition for the DC/DC connector 887 (and/or 888).

If the DC/DC connector 887 of the canister 4 is connected to the DC/DC connector 888 of the back plane board 22, and the connector 107 of the canister 4 is connected to a second connector 105 of the back plane board 22, then a disk identification signal according to the composition of the DC/DC connector 887 (and/or 888) is output from the DC/DC connector 887 to the boost value output section 899. For example, in the example shown in FIG. 25C, the DC/DC connector 887 (and/or 888) of a canister 4 fitted with a disk drive 4a having a disk type of FC and a transfer speed of 4 Gbps, and whose provider is Company A, outputs a disk identification signal where only the first bit is raised, to the boost value output section 899. Furthermore, as described hereinafter, the disk identification signal is also output to the HDD control board 20, via the back plane board 22.

The boost value output section 899 receives the disk identification signal, acquires the boost value corresponding to the contents of this disk identification signal (for example, depending on which bit of the signal is raised), from the signal correction value table 897, and outputs this boost value. The boost value thus output is set in the equalizer 813 of the transmission circuit 17D of the disk drive 4a, from the DC/DC connector 887, via the back plane board 22 and the connector 105.

By means of the composition described above, if a canister 4 is connected to the back plane board 22, a suitable boost value corresponding to the disk attribute of the disk drive 4a installed in that canister 4 is automatically established in that disk drive 4a. If the reception circuit 18D is provided with an equalizer which boosts the high-frequency portion of the signal, then the boost value may be set in this equalizer in the reception circuit 18D.

FIG. 26A shows an example of the composition of an HDD control board 20 according to the third embodiment of the present invention.

Furthermore, the contents of the signal correction value table 897 provided in the HDD control board 20 are similar to those of the signal correction value table 897 provided in the canister 4.

The boost value setting region 817 is a register, for example, and has a plurality of addresses. As shown in FIG. 26B, each of the plurality of addresses is assigned to one of a plurality of communications ports. Here, a communications port is a physical or logical communications port of the PBC 14, and one communications port corresponds, for example, to one transmission circuit 17P or reception circuit 18P. Consequently, assigning an address to each of the communications ports is equivalent to assigning an address to each of the transmission circuits 17P or each of the reception circuits 18P.

The board control section 815 is able to communicate with the management terminal 5, for example. The board control section 815 receives boost values to be recorded in the signal correction value table 897, from the management terminal 5, for example, and is able to write these boost values to the signal correction value table 897 in the HDD control board 20.

Furthermore, the board control section 815 receives a disk identification signal from the DC/DC connector 887 of the canister 4, via the back plane board 22. The board control section 815 reads out a boost value corresponding to the contents of the received disk identification signal (for example, depending on which bit of the signal is raised), and it registers the boost value thus read out at a prescribed address of the boost value setting region 817. Here, the address at which to register the boost value is determined according to the route via which the disk identification signal was received, for instance. For example, if a plurality of signal paths corresponding to a plurality of canisters 4 are provided between the plurality of canisters 4 and the board control section 815, then the board control section 815 determines the storage address for the boost value in the boost value setting region 817, according to the signal path via which it received the disk identification signal, and it then registers the boost value read out as described above, at the storage address thus determined.

The boost value registered in the boost value setting region 817 is read out to the transmission amplification control section 901 and the boost setting section 903 of each transmission circuit 17P, for example. The transmission amplification control section 901 regulates the value of the transmission amplification coefficient K (in other words, it regulates the amplitude of the transmission signal), on the basis of the boost value thus read out. The boost setting section 903 determines the high-range correction coefficient Em, on the basis of the boost value thus read out, and it sets this high-range correction coefficient value Em in the equalizer 807. The value of the high-range correction coefficient Em may be the same as the boost value, or it may be a different value determined on the basis of the boost value.

Furthermore, a reception side equalizer 807 may be provided in the reception circuit 18P. This equalizer 807 may carry out prescribed correction processes, for example, performing de-emphasis with respect to the received signal (a signal which was pre-emphasized before transmission).

Figure 27:
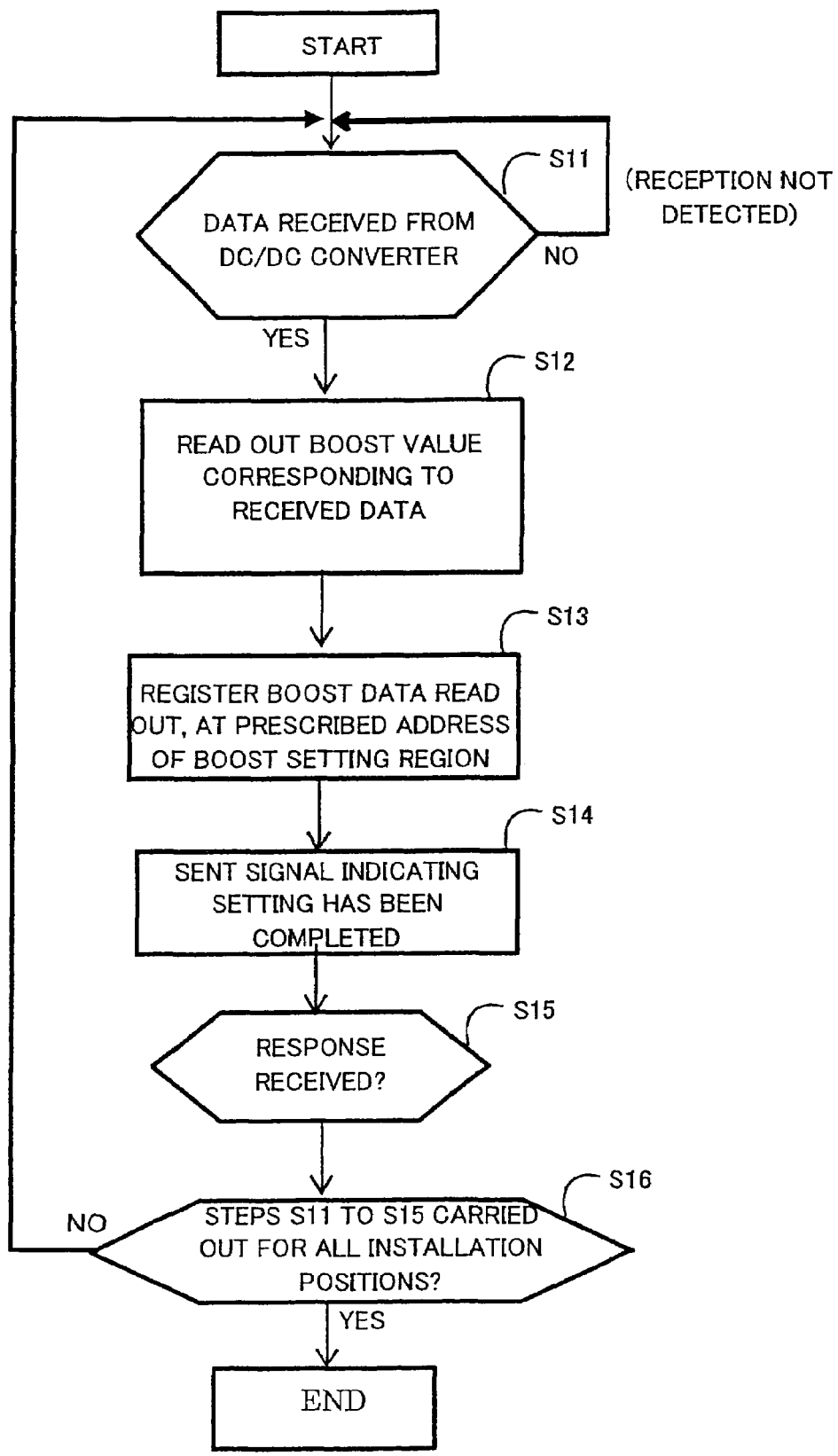
FIG. 27 shows one example of a processing sequence for setting respective boost values in the boost value setting region 817, in a third embodiment of the present invention.

FIG. 27 shows one example of a processing sequence for setting respective boost values in the boost value setting region 817, in a third embodiment of the present invention.

If a disk identification signal is received from the DC/DC connector 887 (YES at S11), then the board control section 815 reads out the boost value corresponding to the contents of the received disk identification signal, from the signal correction value table 897 (S12), and it sets the boost value thus read out in the boost value setting region 817 (S13). When this setting process has been completed, the board control section 815 sends a signal indicating that setting has been completed, to the disk drive 4a which transmitted the disk identification signal (S14). If the board control section 815 receives a response (YES at S15), then if steps S11 to S15 have not yet been carried out for all of the disk drive installation positions (NO at S16), these steps S11 to S15 are performed for the other disk drive installation positions. At S15, a response is received from the disk drive 4a when a boost value corresponding to the disk identification signal received at S11 has been set in the equalizer 813 of the disk drive 4a, for example.

According to this processing sequence, boost values corresponding to the disk attribute of the connected disk drives 4a are established in both the HDD control board 20 and the disk drives 4a, in respect of all of the disk drive installation positions.

According to the third embodiment described above, boost values corresponding to the disk attribute (at least one of the disk type, transfer speed and provider, for example), are set in the equalizers 807 and 813, and signals corrected on the basis of these boost values are transmitted. Thereby, it is possible to prevent degradation in signal quality, even if a plurality of disk drives 4a having different disk attributes are combined in the same disk array device 1.

Moreover, according to this third embodiment, at each disk drive 4a, data is transmitted by using a boost value based on the amount of ISI attenuation corresponding to the attributes of that disk drive 4a. Thereby, it is possible to prevent degradation of signal quality, even if data is transferred between disk drives 4a of different disk attributes and the same HDD control board 20, via the same back plane board 22.

Furthermore, according to this third embodiment, if a canister 4 is connected to the back plane board 22, then a boost value corresponding to the disk attribute of the corresponding disk drive 4a is automatically set in both the HDD control board 20 and the disk drive 4a. Accordingly, even when a canister 4 is installed in a disk array device 1, it is not necessary to perform separate tasks for setting the boost values, thus improving the convenience for the user. The method for detecting the disk attribute of the disk drive 4a installed in a canister 4 is not limited to the aforementioned method where a signal having a prescribed bit raised to 1 is output, depending on the composition of the DC/DC connector 887 (and/or 888), and other methods may be adopted. For example, special connectors may be provided respectively on the canister 4 and on the back plane board 22, the composition of the connector provided on the canister 4 varying according to the disk attribute of the disk drive 4a installed in the canister 4. Thereby, a signal indicating the type of special connector of the canister 4 that has been connected to the special connector of the back plane board 22 (for example, a signal indicating which of a plurality of pins in the special connector of the back plane board 22 have been connected to the connector of the canister 4) is output, and the disk attribute can be detected from this signal.

Above, a preferred mode and several embodiments of the present invention were described, but these are simply examples for the purpose of describing the present invention and the scope of the present invention is not limited to this mode or these embodiments alone. The present invention may be implemented in various further modes. For example, in the case of the equalizers 807 according to the first to third pre-emphasis methods, the plurality of equalizers 807 provided in the PBC 14 do not all have to be of the same composition, and they may also be of different compositions, depending on the size of the boost value set. Furthermore, for example, a communications interface circuit for controlling communications between the disk drive 4a and the PBC 14 may be provided in the canister 4, and the equalizer 813 may be installed in this communications interface circuit. Furthermore, the upstream transmission path 114U and the downstream transmission path 114D may be common transmission paths. Moreover, it is also possible to combine at least two of the first to third embodiments, for example. For example, if all of the first to third embodiments are combined, then the signal correction value table will be a table 951 having the composition shown in FIG. 28, for instance, and hence, it will be possible to transmit data by using boost values corresponding to the ISI attenuation based on all of the following factors, namely: the disk drive installation position (in other words, the length L of the wire between the PBC and the HDD), the wavelength attribute, and the bit number in the disk identification signal (in other words, the disk attribute). Moreover, the boost values can be set for each port provided in the PBC 14, for example, (the ports corresponding to the transmission circuits and the ports corresponding to reception circuits).

What is claimed is:

1. A storage device system in which a plurality of storage devices can be installed, comprising:
    a plurality of signal transmission paths connected respectively to the plurality of installed storage devices;
    a plurality of system side communications sections for transmitting and receiving signals respectively to and from said plurality of storage devices, via said plurality of signal transmission paths; and
    one or a plurality of signal correcting sections for inputting a signal exchanged between said plurality of storage devices and said plurality of system side communications sections, correcting said input signal on the basis of a previously established correction parameter, and outputting the corrected signal;
    wherein said correction parameter is a value set on the basis of at least one of a length of the signal transmission path between the storage device and the system side communications section, a wavelength attribute of the signal input to said signal correcting section, and a storage device attribute relating to the storage device.

2. The storage device system according to claim 1,
    wherein said correction parameter is a signal boost value; and
    each of said plurality of signal correcting sections boosts at least one of a signal transmitted by said storage device, a signal transmitted by said system side communications section, and a signal passing through said signal transmission path, on the basis of said boost value, and then transmits the boosted signal.

3. The storage device system according to claim 2,
    wherein said boost value is a value based on the attenuation due to inter symbol interference corresponding to the length of the signal transmission path.

4. The storage device system according to claim 1,
    wherein said storage device attribute is at least one of the data transfer speed, the type or the provider of said storage device.

5. The storage device system according to claim 4,
    wherein said data transfer speed is a speed based on the signal frequency, where dielectric loss is more dominant than conductor loss.

6. The storage device system according to claim 1, further comprising:
    a storage device attribute determining section for determining the storage device attribute of said installed storage device, on the basis of the installation configuration of said storage device;
    a correction parameter storage region for storing a plurality of correction parameters corresponding respectively to a plurality of types of the storage device attributes; and
    a correction parameter setting section for setting a correction parameter corresponding to said determined storage device attribute, and stored in said correction parameter storage region, in the signal correcting section of said plurality of signal correcting sections that relates to said installed storage device.

7. The storage device system according to claim 6,
    wherein each of said plurality of storage devices is accommodated in a storage device casing, and is installed in said storage device system together with said storage device casing;
    said storage device casing comprises a casing connection section having a composition corresponding to the storage device attribute of the storage device accommodated in that storage device casing;

said storage device system comprises a system side connection section for connecting with said casing connection section;

a storage device attribute identification signal having a waveform corresponding to the composition of said casing connection section is output when said casing connection section is connected to said system side connection section; and said storage device, attribute determining section determines the storage device attribute of said installed storage device, on the basis of said storage device attribute identification signal thus output.

8. A signal transmission method for a storage device system in which a plurality of storage devices can be installed, wherein said storage device system comprises:

a plurality of signal transmission paths connected respectively to the plurality of installed storage devices; and a plurality of system side communications sections for transmitting and receiving signals respectively to and from said plurality of storage devices, via said plurality of signal transmission paths;

the following steps (A) to (C) are implemented for each signal transmission path;

(A) a step of inputting a signal exchanged between a storage device and a system side communications section;

(B) a step of correcting said input signal on the basis of a previously set correction parameter; and (C) a step of outputting the corrected signal; and said correction parameter is a value established on the basis of any one of a length of the signal transmission path, a wavelength attribute of said input signal, and a storage device attribute relating to the storage device.

9. A storage device system comprising:

a storage device installation board being a printed circuit board to which a plurality of storage devices are connected;

a storage device control board, being a printed circuit board to which a storage device installation board is connected, for controlling said plurality of storage devices via said storage device installation board;

a plurality of transmission circuits, provided on said storage device control board, for transmitting signals to said plurality of storage devices, respectively, via a plurality of first signal transmission paths;

a plurality of reception circuits, provided on said storage device control board, for receiving signals from said plurality of storage devices, respectively, via a plurality of second signal transmission paths;

a plurality of signal correcting devices provided respectively in said plurality of transmission circuits;

a boost value storage region for storing a plurality of signal boost values determined on the basis of at least one of a length of the first signal transmission path, a signal wavelength attribute, and a storage device attribute relating to the storage device;

a boost value setting region in which at least one of the plurality of signal boost values stored in said boost value storage region is set;

and a processor for setting at least one of the plurality of signal boost values stored in said boost value storage region, in said boost value setting region;

wherein said boost value setting region has a plurality of setting region addresses corresponding respectively to said plurality of transmission circuits;

said processor sets, in each of said plurality of setting region addresses, the signal boost value to be used by the signal correction device provided in the transmission circuit corresponding to that setting region address, said signal boost value being determined on the basis of at least one of the length of the first signal transmission path for the signal transmitted by the corresponding transmission circuit, the wavelength attribute and the transmission destination of the signal from that transmission circuit; and said signal correcting devices respectively input a signal, boost the input signal on the basis of the signal boost value set in the setting region address corresponding to the transmission circuit in which the signal correcting devices are provided, and output the boosted signal.

10. The storage device system according to claim 9, wherein each of said plurality of storage devices is accommodated in a storage device casing, and is installed in said storage device system together with said storage device casing;

said storage device casing comprises a casing connection section having a composition corresponding to the storage device attribute of the storage device accommodated in that storage device casing;

said storage device installation board comprises a plurality of system side connection sections for connecting with said casing connection section;

a storage device attribute identification signal having a waveform corresponding to the composition of said casing connection section is output when said casing connection section is connected to said system side connection section; and said processor determines the storage device attribute of a storage device that has been installed, and the position on said storage device installation board at which the storage device has been installed, on the basis of the output source and the waveform of the storage device attribute identification signal, and sets a signal boost value corresponding to the storage device attribute thus determined in the setting region address corresponding to the transmission circuit which transmits signals to the storage device installed at the installation position thus determined.

\* \* \* \* \*